US012509910B2

(12) United States Patent
Scheffler et al.

(10) Patent No.: US 12,509,910 B2
(45) Date of Patent: Dec. 30, 2025

(54) ELECTRONIC LOCK CORE REPLACEMENT METHODS

(71) Applicant: Knox Associates, Inc., Phoenix, AZ (US)

(72) Inventors: Dominik Scheffler, Phoenix, AZ (US); Benjamin Alan Grover, Phoenix, AZ (US); Brandon Ryan Baron, Phoenix, AZ (US)

(73) Assignee: Knox Associates, Inc., Phoenix, AZ (US)

( * ) Notice: Subject to any disclaimer, the term of this patent is extended or adjusted under 35 U.S.C. 154(b) by 105 days.

(21) Appl. No.: 18/514,134

(22) Filed: Nov. 20, 2023

(65) Prior Publication Data

US 2024/0169777 A1 May 23, 2024

Related U.S. Application Data

(60) Provisional application No. 63/384,590, filed on Nov. 21, 2022.

(51) Int. Cl.
*E05B 9/08* (2006.01)
*E05B 17/00* (2006.01)
(Continued)

(52) U.S. Cl.
CPC .......... *E05B 9/084* (2013.01); *E05B 17/0004* (2013.01); *E05B 19/00* (2013.01); *G07C 9/00944* (2013.01)

(58) Field of Classification Search
CPC . E05B 9/08; E05B 9/084; E05B 9/086; E05B 9/088; E05B 17/0004;
(Continued)

(56) References Cited

U.S. PATENT DOCUMENTS 2,391,833 A * 12/1945 Johnstone ............... E05B 9/084 70/367
4,063,435 A * 12/1977 Oliver ..................... E05B 67/24 70/52
(Continued)

FOREIGN PATENT DOCUMENTS

WO WO 2019/051337 A1 3/2019
WO WO 2019/200257 A1 10/2019

OTHER PUBLICATIONS

International Search Report and Written Opinion received in PCT Application No. PCT/US2023/080582 dated Apr. 2, 2024 in 17 pages.

*Primary Examiner* — Nathan Cumar
(74) *Attorney, Agent, or Firm* — Knobbe, Martens, Olson & Bear, LLP

(57) ABSTRACT

Electronic locks can provide improved security over mechanical locks. Despite the improved security of electronic locks, there may be occasions where it is desirable to replace the electronic lock. Replacing an electronic lock can be expensive and challenging, particularly if the electronic lock is being replaced by a different electronic lock produced by a different manufacturer. The present disclosure relates to an electronic lock with a replaceable lock core that enables replacing the electronic lock core with a new electronic lock core without needing to replace the entire electronic lock. Further, through use of access controls managed by the electronic lock and electronic key combination, and the unique mechanical configurations disclosed herein, it is possible to replace an electronic lock core without compromising security of a device or location secured by the electronic lock.

21 Claims, 24 Drawing Sheets

(51) Int. Cl.
*E05B 19/00* (2006.01)
*G07C 9/00* (2020.01)

(58) Field of Classification Search
CPC .... E05B 17/0008; E05B 19/00; E05B 11/005; G07C 9/0094; G07C 2009/00952
USPC .......................................................... 70/283.1
See application file for complete search history.

(56) References Cited

U.S. PATENT DOCUMENTS

| | | | | | | |
|---|---|---|---|---|---|---|
| 4,067,214 | A | * | 1/1978 | Kiraly | E05B 29/0013 | 70/377 |
| 4,158,952 | A | * | 6/1979 | Oliver | E05B 67/24 | 70/52 |
| 4,180,999 | A | * | 1/1980 | Hurskainen | E05B 21/066 | 70/377 |
| 4,250,533 | A | * | 2/1981 | Nelson | G07C 9/00309 | 340/5.25 |
| 4,300,370 | A | * | 11/1981 | Kaiser | E05B 67/38 | 70/54 |
| 4,315,420 | A | * | 2/1982 | Oliver | E05B 9/10 | 70/389 |
| 4,328,690 | A | * | 5/1982 | Oliver | E05B 27/0039 | 70/369 |
| 4,404,825 | A | * | 9/1983 | Dixon | E05B 9/084 | 70/371 |
| 4,458,835 | A | * | 7/1984 | Li | A61B 17/0684 | 227/19 |
| 4,530,223 | A | * | 7/1985 | Oliver | E05B 15/1614 | 70/448 |
| 4,552,001 | A | * | 11/1985 | Roop | E05B 5/003 | 70/417 |
| 4,603,564 | A | * | 8/1986 | Kleinhany | E05B 47/0642 | 70/277 |
| 4,617,811 | A | * | 10/1986 | Roop | E05B 63/122 | D12/1 |
| 4,635,455 | A | * | 1/1987 | Oliver | E05B 27/0082 | 70/494 |
| 4,658,105 | A | * | 4/1987 | Seckinger | G07C 9/00944 | 200/43.05 |
| 4,682,799 | A | * | 7/1987 | Luker | E05B 55/06 | 70/149 |
| 4,688,409 | A | * | 8/1987 | Oliver | E05B 15/1614 | 70/451 |
| 4,712,398 | A | * | 12/1987 | Clarkson | E05B 47/063 | 70/276 |
| 4,720,041 | A | * | 1/1988 | Swenson | G07F 9/06 | 232/7 |
| 4,721,849 | A | * | 1/1988 | Davis | G06K 19/07769 | 235/455 |
| 4,723,427 | A | * | 2/1988 | Oliver | E05B 27/0082 | 70/494 |
| 4,730,471 | A | * | 3/1988 | Seckinger | E05B 47/0619 | 70/277 |
| 4,732,022 | A | * | 3/1988 | Oliver | E05B 27/0039 | 70/494 |
| 4,761,976 | A | * | 8/1988 | Kleinhany | E05B 47/0623 | 70/277 |
| 5,319,362 | A | * | 6/1994 | Hyatt, Jr. | G08B 25/008 | 340/542 |
| 5,337,043 | A | * | 8/1994 | Gokcebay | G07C 9/257 | 340/5.67 |
| 5,351,042 | A | * | 9/1994 | Aston | E05B 47/063 | 361/172 |
| 5,367,295 | A | * | 11/1994 | Gokcebay | G07C 9/00944 | 235/382 |
| 5,373,718 | A | * | 12/1994 | Schwerdt | E05B 47/063 | 340/5.67 |
| 5,419,168 | A | * | 5/1995 | Field | E05B 27/0053 | 70/494 |
| 5,458,382 | A | * | 10/1995 | Boadwine | E05B 9/002 | 292/337 |
| 5,469,727 | A | * | 11/1995 | Spahn | G07C 9/00309 | 70/277 |
| 5,491,470 | A | * | 2/1996 | Veligdan | H03K 17/941 | 341/35 |
| 5,495,241 | A | * | 2/1996 | Donig | G06K 7/0008 | 323/356 |
| 5,541,581 | A | * | 7/1996 | Trent | G07C 9/00571 | 340/5.55 |
| 5,542,274 | A | * | 8/1996 | Thordmark | E05B 47/063 | 70/495 |
| 5,841,363 | A | * | 11/1998 | Jakob | G07C 9/00309 | 70/279.1 |
| 6,178,789 | B1 | * | 1/2001 | Finkelstein | E05B 13/106 | 70/210 |
| 6,201,317 | B1 | * | 3/2001 | Kemmann | E05B 17/22 | 307/9.1 |
| 6,209,367 | B1 | * | 4/2001 | Hyatt, Jr. | E05B 47/063 | 70/278.1 |
| 6,351,206 | B1 | * | 2/2002 | Schweiger | B60R 25/406 | 307/10.6 |
| 6,374,653 | B1 | * | 4/2002 | Gokcebay | G07C 9/00944 | 70/277 |
| 6,467,602 | B2 | * | 10/2002 | Bench | G07F 17/248 | 194/902 |
| 6,474,122 | B2 | * | 11/2002 | Davis | E05B 47/0615 | 70/369 |
| 6,477,505 | B2 | * | 11/2002 | Ward, II | G06Q 30/0283 | 705/13 |
| 6,477,875 | B2 | * | 11/2002 | Field | E05B 27/0053 | 70/494 |
| 6,778,067 | B2 | * | 8/2004 | Kakuta | G07C 9/00182 | 340/10.34 |
| 7,000,441 | B2 | * | 2/2006 | Sutton | E05B 47/0623 | 70/276 |
| 7,023,318 | B1 | * | 4/2006 | Geiger | B60R 25/248 | 340/5.31 |
| 7,052,054 | B2 | * | 5/2006 | Luker | E05B 47/0012 | 292/201 |
| 7,099,474 | B1 | * | 8/2006 | Liden | G07C 9/00309 | 235/382 |
| 7,158,008 | B2 | * | 1/2007 | Waring | G07C 9/00309 | 340/5.67 |
| 7,392,675 | B2 | * | 7/2008 | Kito | B60R 25/2063 | 307/10.6 |
| 7,958,758 | B2 | * | 6/2011 | Trempala | E05B 49/002 | 70/369 |
| 8,276,415 | B2 | * | 10/2012 | Trempala | E05B 47/063 | 70/369 |
| 8,347,674 | B2 | * | 1/2013 | Trempala | E05B 49/002 | 70/369 |
| 9,041,510 | B2 | * | 5/2015 | Wolski | G07C 9/00182 | 340/5.6 |
| 10,890,015 | B2 | * | 1/2021 | Pavlovic | E05B 47/02 | |
| 2003/0196148 | A1 | * | 10/2003 | Harrisville-Wolff | H04L 41/0654 | 714/47.1 |
| 2008/0066507 | A1 | * | 3/2008 | Trempala | G07C 9/00309 | 70/283.1 |
| 2008/0072637 | A1 | * | 3/2008 | Padilla | E05B 47/068 | 70/371 |
| 2009/0165512 | A1 | * | 7/2009 | Bellamy | E05B 47/0634 | 70/277 |
| 2011/0239714 | A1 | * | 10/2011 | Trempala | G07C 9/00706 | 70/283.1 |
| 2013/0160505 | A1 | * | 6/2013 | Trempala | E05B 47/00 | 70/283.1 |
| 2020/0095804 | A1 | * | 3/2020 | Pavlovic | E05B 47/02 | |
| 2020/0270904 | A1 | * | 8/2020 | Lee | E05B 17/10 | |
| 2021/0207402 | A1 | * | 7/2021 | Pavlovic | E05B 47/02 | |

* cited by examiner

ELECTRONIC LOCK CORE REPLACEMENT METHODS

INCORPORATION BY REFERENCE

This application claims priority to U.S. Provisional Application No. 63/384,590, filed on Nov. 21, 2022, and titled "ELECTRONIC LOCK CORE REPLACEMENT," and which is hereby incorporated by reference in its entirety for all purposes and made a part of this specification. Further, this application is filed on the same date as U.S. application Ser. No. 18/514,147, which is titled "ELECTRONIC LOCK CORE REPLACEMENT SYSTEMS," and which is hereby incorporated by reference in its entirety for all purposes and made a part of this specification. Any and all applications for which a foreign or domestic priority claim is identified in the Application Data Sheet as filed with the present application are hereby incorporated by reference under 37 CFR 1.57. Further, non-limiting examples of electronic keys and electronic locks that may implement one or more embodiments disclosed herein or that may be used in conjunction with one or more embodiments disclosed herein are disclosed in U.S. Pat. Nos. 7,958,758; 8,276,415; 9,041,510; and 10,890,015, each of which is hereby incorporated by reference in its entirety for all purposes and made a part of this specification, which is hereby incorporated by reference in its entirety for all purposes and made a part of this specification.

TECHNICAL FIELD

The present disclosure generally relates to electronic locks, and more specifically, to retention and replacement of an electronic lock core of an electronic lock.

BACKGROUND

Electronic locks have several advantages over normal mechanical locks. For example, electronic locks may be encrypted so that only a key carrying the correct code will operate the lock. In addition, an electronic lock may contain a microprocessor so that, for example, a record can be kept of who has operated the lock during a certain time period or so that the lock is only operable at certain times. An electronic lock may also have the advantage that, if a key is lost, the lock may be reprogrammed to prevent the risk of a security breach and to avoid the expense associated with replacement of the entire lock.

SUMMARY

The systems, methods, and devices of this disclosure each have several innovative aspects, no single one of which is solely responsible for all of the desirable attributes disclosed herein. Details of one or more implementations of the subject matter described in this specification are set forth in the accompanying drawings and the description below.

In some aspects, the techniques described herein relate to an electronic lock core configured to permit replacement of the electronic lock core within an electronic lock, the electronic lock core including: an electronic lock core plug; an electronic lock core shell configured to house at least the electronic lock core plug and a retainment assembly; and the retainment assembly configured to retain the electronic lock core at least partially within an electronic lock housing of the electronic lock, wherein the retainment assembly includes: a screw; a retainer ramp configured to move axially along the screw from a first position to a second position when the screw is rotated; and a control lug configured to engage with the electronic lock housing when the retainer ramp is in the first position and to disengage from the electronic lock housing when the retainer ramp is in the second position, wherein the retainment assembly retains the electronic lock core within the electronic lock housing when the control lug engages the electronic lock housing.

In some aspects, the techniques described herein relate to an electronic lock core, wherein the retainment assembly is further configured to enable the electronic lock core to be removed from the electronic lock when the control lug disengages from the electronic lock housing.

In some aspects, the techniques described herein relate to an electronic lock core, further including a screw guard configured to prevent access to the screw.

In some aspects, the techniques described herein relate to an electronic lock core, wherein the screw guard magnetically engages with the screw to hold the screw guard in place.

In some aspects, the techniques described herein relate to an electronic lock core, wherein the screw guard includes a magnet that magnetically engages with the screw to hold the screw guard in place.

In some aspects, the techniques described herein relate to an electronic lock core, further including a magnet that is positioned within a shaft of the screw guard, wherein the magnet engages with the screw to hold the screw guard in place.

In some aspects, the techniques described herein relate to an electronic lock core, wherein a magnetic strength of the screw guard is less than a magnetic strength of an electronic key configured to engage with the electronic lock core plug enabling removal of the screw guard using the electronic key.

In some aspects, the techniques described herein relate to an electronic lock core, wherein the electronic lock core plug is rotatable between a first position and a second position, wherein the electronic lock core plug prevents removal of the screw guard when the electronic lock core plug is in the first position.

In some aspects, the techniques described herein relate to an electronic lock core, wherein the electronic lock core plug permits removal of the screw guard when the electronic lock core plug is in the second position.

In some aspects, the techniques described herein relate to an electronic lock core, wherein the electronic lock core plug permits removal of the screw guard when the electronic lock core plug is in the second position and an electronic key is not engaged with the electronic lock core plug.

In some aspects, the techniques described herein relate to an electronic lock core, wherein the electronic lock core permits disengagement of the electronic key when the electronic lock core plug is in the second position and the electronic key includes a control key, and wherein the electronic lock core prevents disengagement of the electronic key when the electronic lock core plug is in the second position and the electronic key does not include the control key.

In some aspects, the techniques described herein relate to an electronic lock core, wherein the control key omits a retention tab that is included in a non-control key, wherein the retention tab prevents removal of the non-control key when the electronic lock core is in an unlocked state.

In some aspects, the techniques described herein relate to an electronic lock core, wherein the electronic lock core plug includes a flange with a notch, wherein the notch aligns with the screw guard when the electronic lock core plug is in the second position, and wherein the notch is not aligned with the screw guard when the electronic lock core plug is in the first position.

In some aspects, the techniques described herein relate to an electronic lock core, further including a pin configured to prevent the screw from being removed from the retainer ramp.

In some aspects, the techniques described herein relate to an electronic lock core, wherein the pin includes a dowel pin, a roll pin, a taper pin, or a cotter pin.

In some aspects, the techniques described herein relate to an electronic lock core, further including a screw guard configured to prevent access to the screw, wherein the screw guard includes a slot configured to at least partially surround the pin when the screw guard magnetically engages with the screw.

In some aspects, the techniques described herein relate to an electronic lock core, wherein the control lug is further configured to prevent movement of the electronic lock core within the electronic lock housing when the retainer ramp is in the first position.

In some aspects, the techniques described herein relate to an electronic lock, wherein the control lug is further configured to prevent the movement of the electronic lock core within the electronic lock housing in one or more of an axial direction, a lateral direction, an angular direction, or a rotational direction.

In some aspects, the techniques described herein relate to an electronic lock core, wherein the control lug is further configured to prevent movement of the electronic lock core within the electronic lock housing by more than a threshold degree when the retainer ramp is in the first position.

In some aspects, the techniques described herein relate to an electronic lock core, further including a cam lock that protrudes from the electronic lock core plug when the electronic lock core is in a locked state and that retracts into a cavity of the electronic lock core plug when the electronic lock core is in an unlocked state.

In some aspects, the techniques described herein relate to an electronic lock core, wherein the cam lock prevents rotation of the electronic lock core plug within the electronic lock core when the electronic lock core is in the locked state.

In some aspects, the techniques described herein relate to an electronic lock core, wherein the electronic lock core is a small format interchangeable core, and wherein an aperture of the electronic lock housing is configured to receive the small format interchangeable core.

In some aspects, the techniques described herein relate to an electronic lock core, wherein the control lug is further configured to engage with a protrusion of an aperture of the electronic lock housing when the retainer ramp is in the first position preventing removal of the electronic lock core from the electronic lock.

In some aspects, the techniques described herein relate to an electronic lock core, wherein the control lug is further configured to disengage from a protrusion of an aperture of the electronic lock housing when the retainer ramp is in the second position enabling removal of the electronic lock core from the electronic lock.

In some aspects, the techniques described herein relate to an electronic lock including: the electronic lock core; and the electronic lock housing.

In some aspects, the techniques described herein relate to an electronic lock including: an electronic lock housing; and an electronic lock core configured to permit replacement of the electronic lock core within the electronic lock housing, the electronic lock core including: an electronic lock core plug; an electronic lock core shell configured to house at least the electronic lock core plug and a retainment assembly; and the retainment assembly configured to retain the electronic lock core at least partially within the electronic lock housing of the electronic lock, wherein the retainment assembly includes: a screw; a retainer ramp configured to move axially along the screw from a first position to a second position when the screw is rotated; and a control lug configured to engage with the electronic lock housing when the retainer ramp is in the first position and to disengage from the electronic lock housing when the retainer ramp is in the second position, wherein the retainment assembly retains the electronic lock core within the electronic lock housing when the control lug engages the electronic lock housing.

In some aspects, the techniques described herein relate to an electronic lock, further including a locking mechanism, wherein a state of the locking mechanism is controllable, at least in part, by the electronic lock core.

In some aspects, the techniques described herein relate to an electronic lock, wherein the locking mechanism includes at least one of: a padlock, a cabinet lock, a deadbolt, a mortise lock, a deadlatch, a latch, a cam lock, or a knob lock.

In some aspects, the techniques described herein relate to an electronic lock, wherein the electronic lock includes a small format interchangeable core form factor configured to receive a small format interchangeable core.

In some aspects, the techniques described herein relate to an electronic lock, wherein the electronic lock core includes a small format interchangeable core, and wherein the electronic lock includes an aperture configured to receive the small format interchangeable core.

In some aspects, the techniques described herein relate to a method of installing an electronic lock core of an electronic lock, the method including: inserting the electronic lock core into an aperture of an electronic lock housing of the electronic lock such that the electronic lock core is positioned so that a face of the electronic lock core is exposed to a user via the aperture of the electronic lock housing; rotating a screw that is accessible via a screw access port of the electronic lock core and that is inserted into a retainer ramp to cause the retainer ramp to move axially along the screw from a first position to a second position, and wherein moving the retainer ramp from the first position to the second position causes a control lug to engage with the electronic lock housing of the electronic lock; inserting a screw guard into the screw access port of the electronic lock core, wherein the screw access port provides access to a screw head of the screw, and wherein the screw guard prevents access to the screw head when the screw guard is inserted into the screw access port; and using an electronic key, rotating an electronic lock core plug of the electronic lock core to align a notch within a flange of the electronic lock core plug such that the screw guard cannot be removed from the screw access port.

In some aspects, the techniques described herein relate to a method, wherein the electronic key includes a control key, and wherein the control key omits a retention tab that is included in a non-control key, and wherein the retention tab prevents removal of the non-control key when the electronic lock core is in an unlocked state.

In some aspects, the techniques described herein relate to a method, wherein the electronic lock core is a small format interchangeable core, and wherein the aperture of the electronic lock housing is configured to receive the small format interchangeable core.

In some aspects, the techniques described herein relate to a method, wherein causing the control lug to engage with the electronic lock housing prevents the electronic lock core from moving within or being removed from the electronic lock housing.

In some aspects, the techniques described herein relate to a method, wherein the flange is a part of the electronic lock core plug.

In some aspects, the techniques described herein relate to a method, wherein the electronic lock core includes a replaceable electronic lock core.

In some aspects, the techniques described herein relate to a method, wherein rotating the screw includes rotating the screw in a direction that tightens the screw.

In some aspects, the techniques described herein relate to a method, wherein moving the retainer ramp from the first position to the second position further causes the control lug to engage with a protrusion of an aperture of the electronic lock housing preventing removal of the electronic lock core.

In some aspects, the techniques described herein relate to a method of replacing a first electronic lock core of an electronic lock with a second electronic lock core, the method including: coupling a control key with a first electronic lock core plug of the first electronic lock core to unlock the electronic lock; rotating the first electronic lock core plug to align a notch within a flange of the first electronic lock core plug with a first screw guard that is installed into a first screw access port of the first electronic lock core; removing the first screw guard from the first screw access port of the first electronic lock core, wherein the first screw access port provides access to a screw head of a first screw, wherein the first screw guard prevents access to the screw head when the first screw guard is inserted into the first screw access port, and wherein the first screw is inserted into a first retainer ramp; rotating the first screw in a first direction to cause the first retainer ramp to move axially along the first screw from a second position to a first position, wherein moving the first retainer ramp from the second position to the first position causes a first control lug to disengage from an electronic lock housing of the electronic lock; removing the first electronic lock core from an aperture of the electronic lock housing of the electronic lock; and installing the second electronic lock core into the electronic lock housing.

In some aspects, the techniques described herein relate to a method, wherein the control key prevents removal of the first screw guard when the control key is coupled to the first electronic lock core plug.

In some aspects, the techniques described herein relate to a method, wherein removing the first screw guard includes decoupling the control key from the first electronic lock core plug after the notch of the first electronic lock core plug is aligned with the first screw guard.

In some aspects, the techniques described herein relate to a method, wherein removing the first screw guard further includes using a first magnet to remove the first screw guard from the first screw access port.

In some aspects, the techniques described herein relate to a method, wherein the first magnet is part of the control key.

In some aspects, the techniques described herein relate to a method, wherein the first screw guard includes a second magnet that engages with the first screw of the first electronic lock core, and wherein a magnetic strength of the first magnet is greater than a magnetic strength of the second magnet.

In some aspects, the techniques described herein relate to a method, wherein removing the first electronic lock core includes using the control key to remove the first electronic lock core by at least: coupling the control key with the first electronic lock core plug; and pulling the first electronic lock core out of the electronic lock housing of the electronic lock.

In some aspects, the techniques described herein relate to a method, wherein the first electronic lock core is a small format interchangeable core, and wherein the aperture of the electronic lock housing is configured to receive the small format interchangeable core.

In some aspects, the techniques described herein relate to a method, wherein rotating the first screw in the first direction includes rotating the first screw in a direction that loosens the first screw.

In some aspects, the techniques described herein relate to a method, wherein the control key omits a retention tab that is included in a non-control key, and wherein the retention tab prevents removal of the non-control key when the first electronic lock core is in an unlocked state.

In some aspects, the techniques described herein relate to a method, wherein the flange is a part of the first electronic lock core plug.

In some aspects, the techniques described herein relate to a method, wherein installing the second electronic lock core includes: inserting the second electronic lock core into the aperture of the electronic lock housing such that the second electronic lock core is positioned so that a face of the second electronic lock core is exposed to a user via the aperture of the electronic lock housing; rotating a second screw of the second electronic lock core in a second direction to cause a second retainer ramp to move axially along the second screw from a first position to a second position, wherein moving the second retainer ramp from the first position to the second position causes a second control lug to engage with the electronic lock housing; inserting a second screw guard into a second screw access port of the second electronic lock core; and using the control key, rotating a second electronic lock core plug of the second electronic lock core to align a notch within a flange of the second electronic lock core plug such that the second screw guard cannot be removed from the second screw access port.

In some aspects, the techniques described herein relate to a method, wherein rotating the second screw in the second direction includes rotating the second screw in a direction that tightens the second screw.

In some aspects, the techniques described herein relate to a method, wherein causing the second control lug to engage with the electronic lock housing prevents the second electronic lock core from moving within or being removed from the electronic lock housing.

In some aspects, the techniques described herein relate to a method, wherein the second screw guard and the first screw guard are the same.

In some aspects, the techniques described herein relate to a method, wherein moving the second retainer ramp from the first position to the second position further causes the second control lug to engage with a protrusion of the aperture of the electronic lock housing preventing removal of the second electronic lock core.

In some aspects, the techniques described herein relate to a method, wherein moving the first retainer ramp from the second position to the first position further causes the first control lug to disengage from a protrusion of the aperture of the electronic lock housing.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure. In addition, various features of different disclosed embodiments can be combined to form additional embodiments, which are part of this disclosure. Further, one or more features or structures can be removed or omitted.

DETAILED DESCRIPTION

Figure 1:
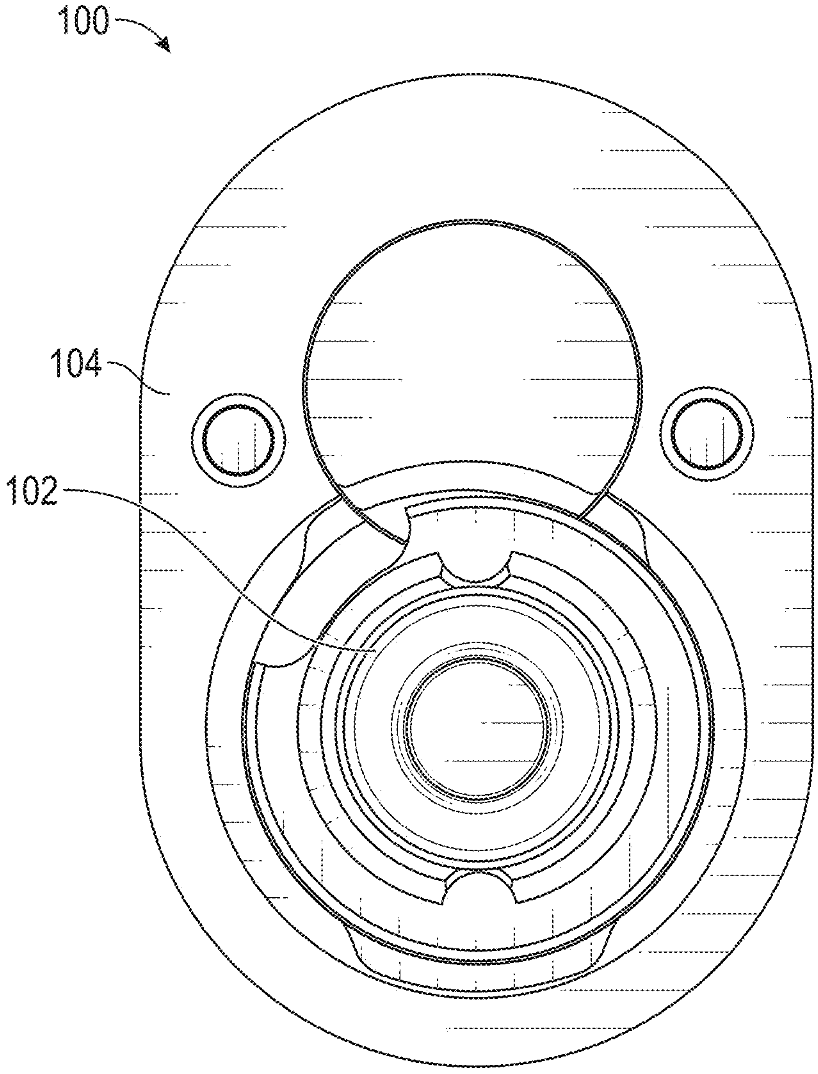
FIG. 1 illustrates a front face of an example of an electronic lock in accordance with certain embodiments disclosed herein.

The headings provided herein, if any, are for convenience only and do not necessarily affect the scope or meaning of the claimed invention.

INTRODUCTION

An electronic lock may have several advantages over mechanical locks including programmability, increased security, logging and auditing features, and unique form factors, among others. Many of the features and advantages of the electronic lock are achieved or implemented, at least in part, by the electronic lock core. The electronic lock core may include some or all of the electrical and electronic features of the electronic lock including, but not limited to, the processor or processing capabilities, the data transfer elements (e.g., near field and short-range communication antennas and chipsets, capacitive and inductive elements, etc.), power circuitry (e.g., capacitors, inductors, batteries, etc.). It should be understood that an electronic lock core may include some or all of the aforementioned example elements, and in some cases, may include additional or alternative circuit elements. Some non-limiting examples of an electronic lock and/or electronic lock core that may be used with embodiments of the present disclose are described in the following patents, which are hereby incorporated by references in their entirety for all purposes and made part of the present specification: U.S. Pat. Nos. 7,958,758; 8,276,415; 9,041,510; and 10,890,015.

Although some electronic locks provide flexibility in that they can be programmed enabling changes in features and/or permissions, there may be cases where it is desirable to change the electronic lock itself. For example, it is possible that new features may be developed in the future that require a hardware modification. As another example, a different entity may assume control of the premises that includes the electronic lock and while in some cases it may be sufficient to reprogram the electronic lock, in other cases it may be desirable to replace the electronic lock because, for example, logistics or a division in control of premises that include a set of electronic locks. As yet another example, it may be desirable to change electronic locks provided by one electronic lock provider because electronic locks of a different electronic lock provider are desired. Regardless of the reason for changing the electronic lock, in certain embodiments it is not desirable to change the entirety of the lock. For example, in some cases, the electronic lock may be physically secured at the location where it is installed. As another example, replacing the electronic lock may be expensive or logistically challenging.

In certain embodiments, the above issues can be addressed by replacing the electronic lock core, or at least a portion thereof, without replacing the entire electronic lock, which may include a housing or other mechanical or physical features. Embodiments of the present disclosure include a system that enables replacement of an electronic lock core. Further, embodiments of the present disclosure include a system that secures the electronic lock core to prevent undesired removal of the electronic lock core.

FIG. 1 illustrates a front face of an example of a portion of an electronic lock 100 in accordance with certain embodiments disclosed herein. The electronic lock 100 may represent a portion of an electronic lock 100 that may further include an electronic lock housing or a housing (not shown), and one or more locking mechanisms that secure a device. The housing may be part of a device (e.g., door, container, etc.) to be secured or may be attached to a device to be secured. Among other features, the electronic lock 100 includes an electronic lock core 104. This electronic lock core 104 may be secured within the electronic lock housing of the electronic lock 100. Further, the electronic lock core 104 may include at least an electronic lock core plug 102. Further, in some cases, the electronic lock 100 may include an electronic lock core shell that housing the electronic lock core 104, which may include the electronic lock core plug 102. The electronic lock 100 may include additional housing, electronic components, or mechanical components that are part of the electronic lock 100. For example, there may be additional physical structure that houses the electronic lock core 104 or that secures the electronic lock core 104 to a premises or other item (e.g., a safe, a medical container, etc.) that is being secured.

Figure 2:
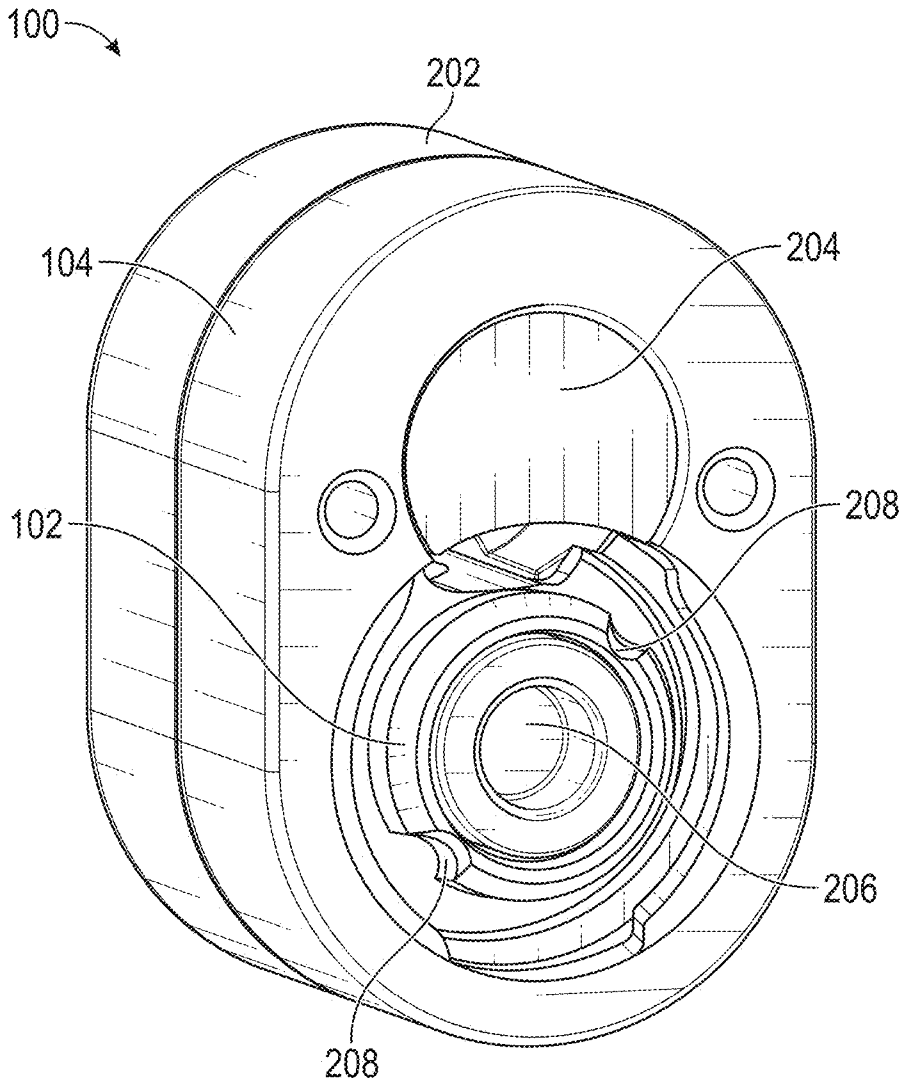
FIG. 2 illustrates a perspective view of the example of the electronic lock of FIG. 1 in accordance with certain embodiments disclosed herein.

FIG. 2 illustrates a perspective view of the example of the portion of the electronic lock 100 of FIG. 1 in accordance with certain embodiments disclosed herein. In addition to the electronic lock core plug 102, the electronic lock core 104 may include a spacer 202. This spacer 202 may provide additional support structure for the electronic lock core 104 that facilitates inserting the electronic lock core 104 into a housing of the electronic lock 100. Further, the electronic lock core plug 102 may include a cup 206 that is configured to receive a nose of an electronic key and one or more recesses 208 that can receive corresponding extensions included in the electronic key.

As previously described, it is desirable in some cases to be able to replace the electronic lock core 104. It is also desirable for the electronic lock core 104 to be secured so that it is not removed by malicious users or accidentally removed. The electronic lock core 104 includes a retainment assembly that can secure or retain the electronic lock core 104 at least partially within an electronic lock housing (not shown) of the electronic lock 100. Further, the retainment assembly may prevent undesirable removal of the electronic lock core 104 and enable ejection of the electronic lock core 104 by an authorized user. The retainment assembly may further prevent or reduce movement of the electronic lock core 104 within the electronic lock 100 or within an electronic lock housing of the electronic lock 100. In some cases, the retainment assembly may reduce movement of the electronic lock core 104 within the electronic lock 100 to less than a threshold degree of movement. Access to the retainment assembly may be permitted or restricted by a screw guard 204. As will be described in more detail below, the screw guard 204 permits or prevents access to a screw that is included as part of the retainment assembly. The retainment assembly is described in more detail below.

Example Retainment Assembly Access

Figure 3A:
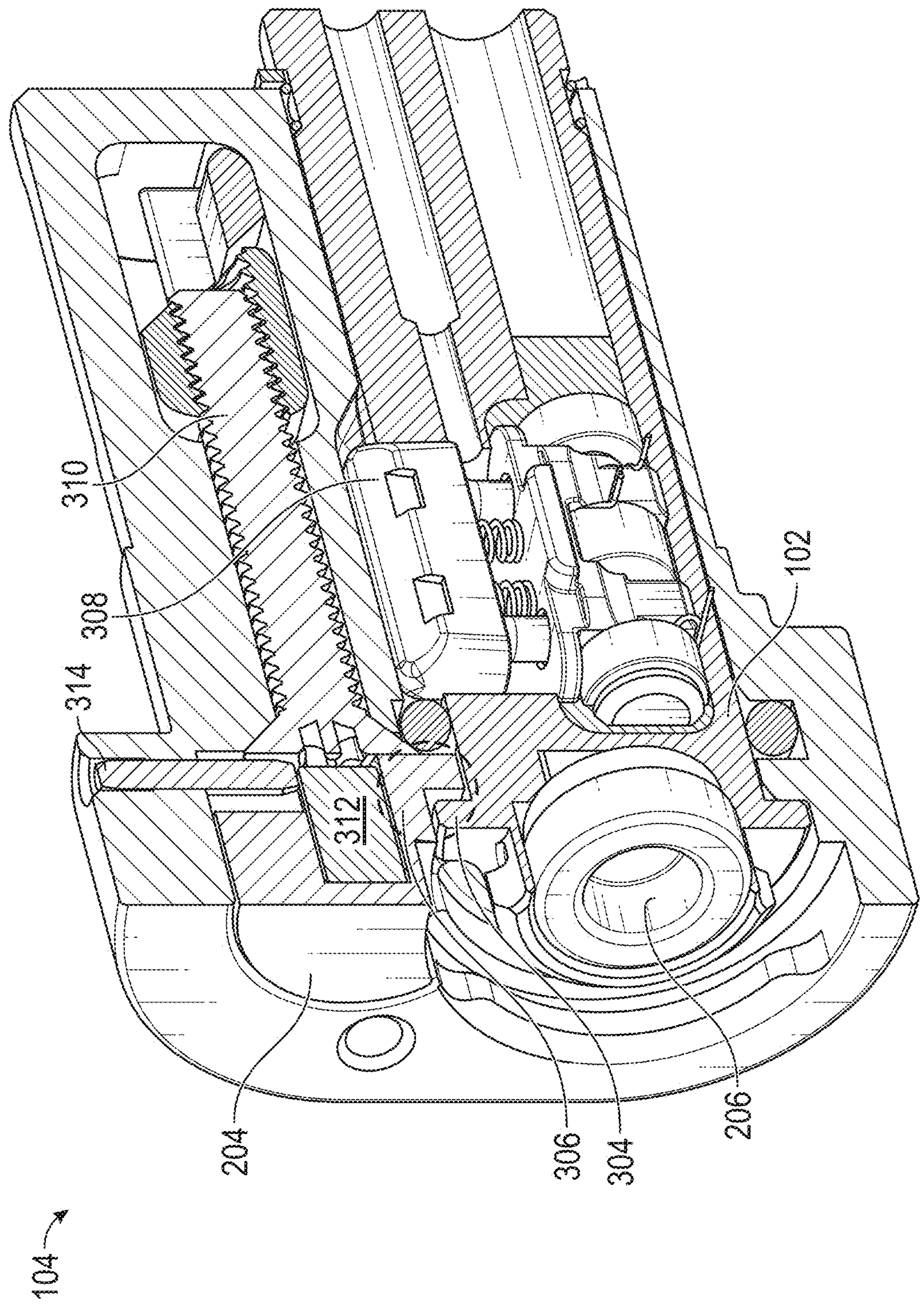
FIG. 3A illustrates a cross section of a perspective view of the example of the electronic lock of FIG. 1 in accordance with certain embodiments disclosed herein.

FIG. 3A illustrates a cross section of a perspective view of the example of the electronic lock core 104 of FIG. 1 in accordance with certain embodiments disclosed herein. As stated above, access to a retainment assembly may be permitted or restricted by a screw guard 204. The screw guard 204 permits or restricts access to a screw 310 that forms a portion of the retainment assembly. The screw 310 may be referred to as a control screw as it may be configured to control a state of the retainment assembly as described in more detail below.

The screw guard 204 may itself be secured by the electronic lock core 104. More specifically, the electronic lock core 104 may include an electronic lock core plug 102 that may serve as a shell for components of the electronic lock core plug 102. Further, the electronic lock core plug 102 may include a flange 304 that overlaps with a protrusion 306 of the screw guard 204 preventing removal of the screw guard 204. As illustrated in FIG. 1, and described in more detail below, the electronic lock core plug 102 may, in certain circumstances, be rotated such that a notch within the flange 304 aligns with the protrusion 306 of the screw guard 204 enabling removal of the screw guard 204.

Returning to FIG. 3A, the electronic lock core plug 102 includes a cam lock 308. The cam lock 308 prevents the electronic lock core plug 102 from being rotated. The cam lock 308 may be a spring-loaded cam lock or any other type of cam lock that prevents rotation of the electronic lock core plug 102.

Further, the screw guard 204 may include a magnet 312 that attracts the screw guard 204 to the screw 310. The attraction of the screw guard 204 to the screw 310 using the magnet 312 helps prevent the screw guard 204 from falling out of a screw access port of the electronic lock core 104 upon unlocking of the electronic lock 100. It should be understood that illustration of the magnet 312 as a separate element from the screw guard 204 is for illustrative purposes only and that the magnet 312 may be integrally formed with the screw guard 204. In some cases, the screw guard 204 may be formed from a magnet in its entirety obviating the need for a separate magnet. In cases where the magnet 312 is a separate element, the magnet 312 may be inserted within a shaft, hole, or indent within the screw guard 204 that is configured to receive and house the magnet 312.

The electronic lock core 104 may further include a pin 314. This pin 314 may prevent removal of the screw 310 from the electronic lock core 104. As is described in more detail herein, a user may tighten or loosen the screw 310 to install or remove the electronic lock core 104 from a housing (not shown) of the electronic lock 100. In some cases, it is desirable to prevent the screw 310 from being removed or from being loosened too much. For example, it may be desirable to prevent removal of the screw 310 to prevent undesired movement of elements of the electronic lock core 104. As another example, it may be desirable to prevent removal of the screw 310 to prevent the screw 310 from being lost or to prevent insertion of undesired elements within the electronic lock core 104 or the electronic lock 100.

The pin 314 may include any type of pin or post that can be used to prevent removal of the screw 310. For example, the pin 314 may be a dowel pin, a roll pin, a taper pin, or a cotter pin. Further, the screw guard 204 may include a slot or other opening that is configured to accommodate the pin 314. For example, as can be seen in FIG. 3A, the screw guard 204 may include a slot that at least partially surrounds the pin 314 enabling the screw guard 204 to be inserted into a screw access port of the electronic lock core 104 without being inhibited by the pin 314.

Figure 3B:
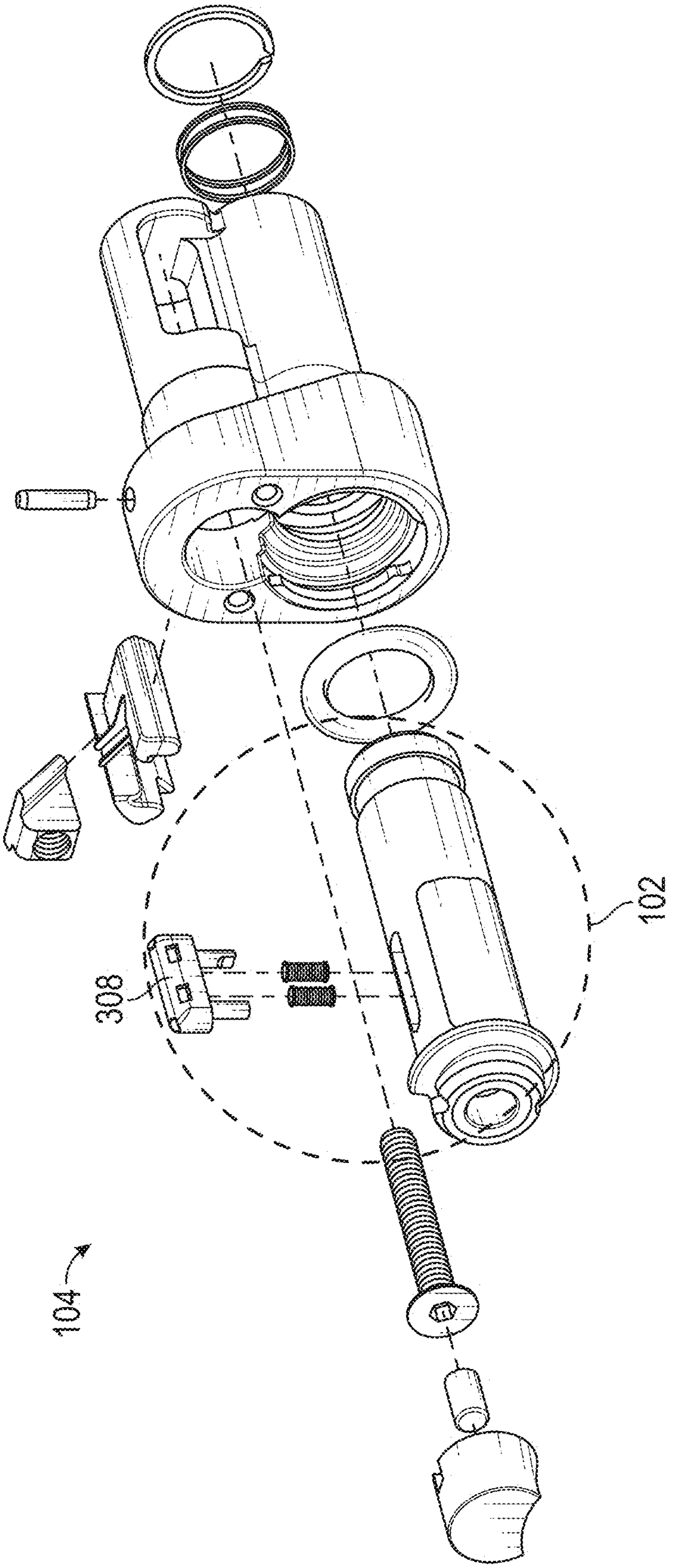
FIG. 3B illustrates an exploded view of the electronic lock core in accordance with certain embodiments disclosed herein.

FIG. 3B illustrates an exploded view of the electronic lock core 104. The electronic lock core 104 may include an electronic lock core shell, an electronic lock core plug 102 with a cam lock 308, and a retainment assembly for retaining the electronic lock core 104 within an electronic lock housing of an electronic lock.

Figure 4:
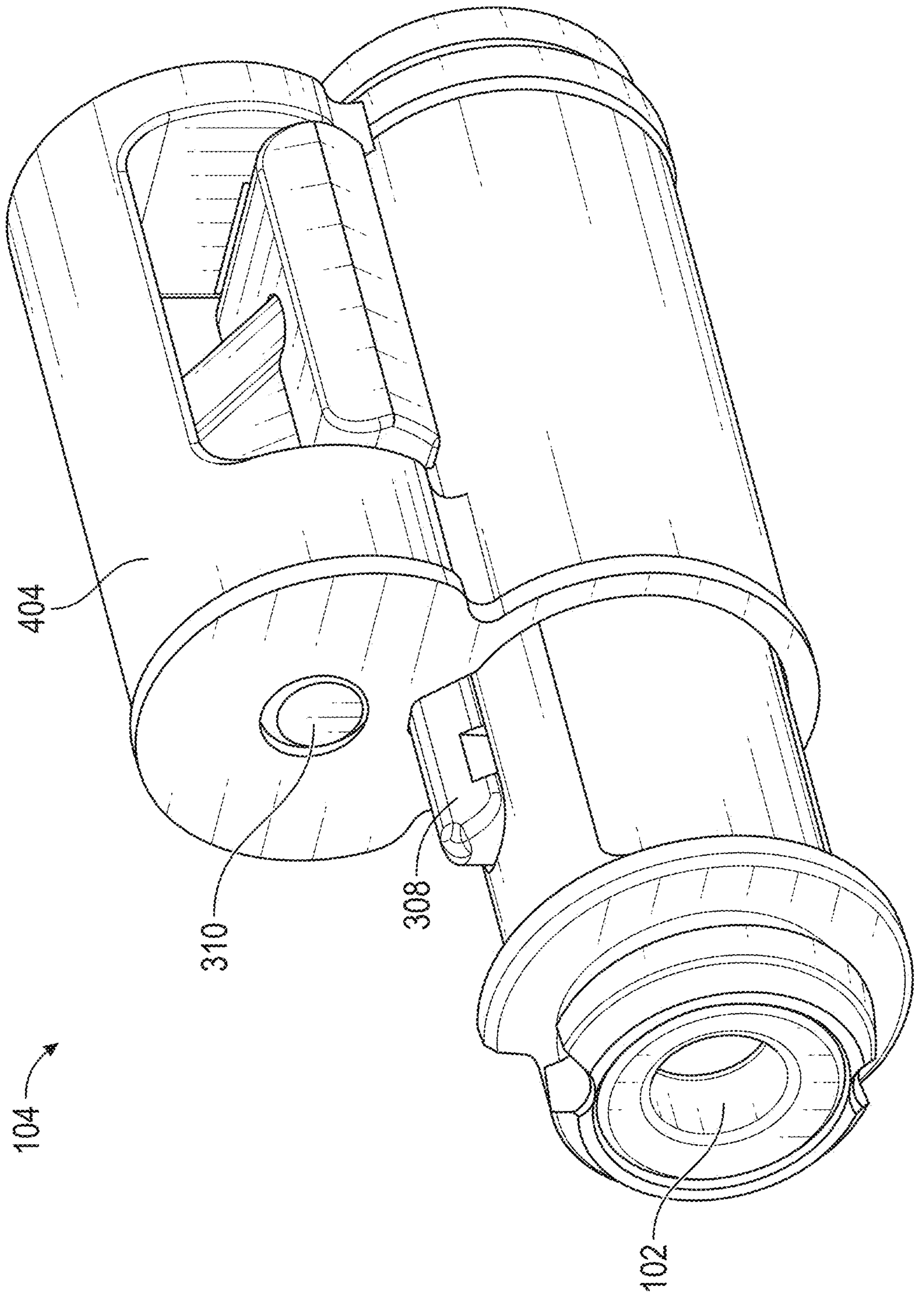
FIG. 4 illustrates a sectioned perspective view of the example of the electronic lock of FIG. 1 with an electronic lock shell and screw sectioned to illustrate a state of a cam lock when an electronic lock core of the electronic lock is in a locked state in accordance with certain embodiments disclosed herein.

FIG. 4 illustrates a sectioned perspective view of the example of the electronic lock core 104 of FIG. 1 with the electronic lock core shell 404 and screw 310 sectioned to illustrate a state of a cam lock 308 when an electronic lock core plug 102 of the electronic lock 100 is in a locked state in accordance with certain embodiments disclosed herein. As illustrated, the cam lock 308 prevents the electronic lock core plug 102 from being rotated when the electronic lock 100 is in a locked state and the cam lock 308 protrudes from the electronic lock core plug 102.

In certain embodiments, to rotate the electronic lock core plug 102, the cam lock 308 is moved from a first position associated with a lock state, to a second position associated with an unlock state. In the unlock state, the cam lock 308 descends into the electronic lock core plug 102 enabling rotation of the electronic lock core plug 102 and consequently, alignment of the notch of the flange 304 with the protrusion 306 of the screw guard 204. When the notch of the flange 304 is aligned with the protrusion 306 of the screw guard 204, the screw guard 204 can be removed.

Figure 5:
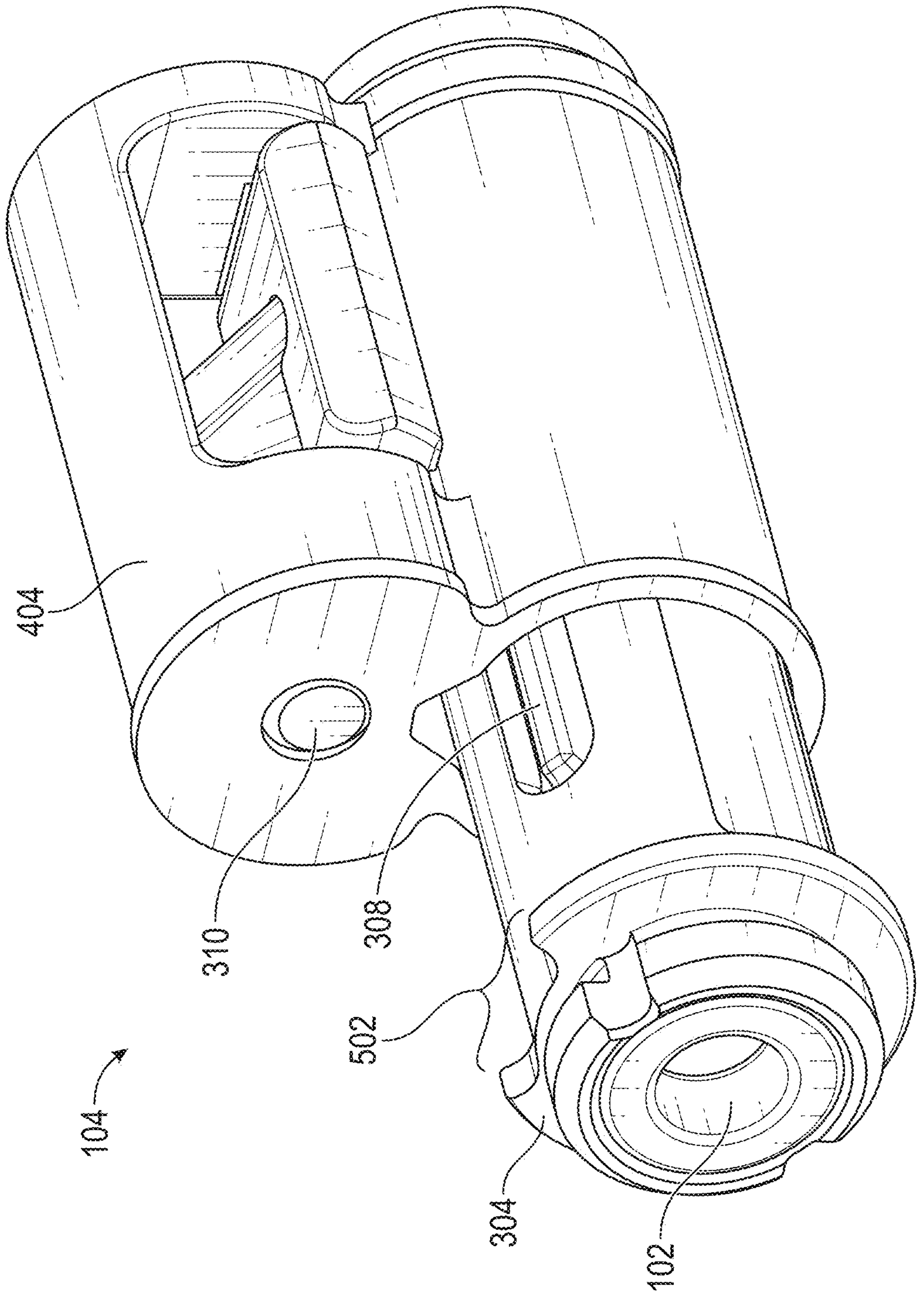
FIG. 5 illustrates a sectioned perspective view of the example of the electronic lock of FIG. 1 with the electronic lock shell and screw sectioned to illustrate the state of the cam lock when the electronic lock core of the electronic lock is in an unlocked state in accordance with certain embodiments disclosed herein.

FIG. 5 illustrates a sectioned perspective view of the example of the electronic lock core 104 of FIG. 1 with the electronic lock core shell 404 and screw 310 sectioned to illustrate the state of the cam lock 308 when the electronic lock core plug 102 of the electronic lock 100 is in an unlocked state in accordance with certain embodiments disclosed herein. As illustrated, the cam lock 308 may retract into a cavity in the electronic lock core plug 102 enabling the electronic lock core plug 102 to be rotated to an unlocked position, and to align the notch 502 in the flange 304 with the protrusion 306 of the screw guard 204.

Figure 6:
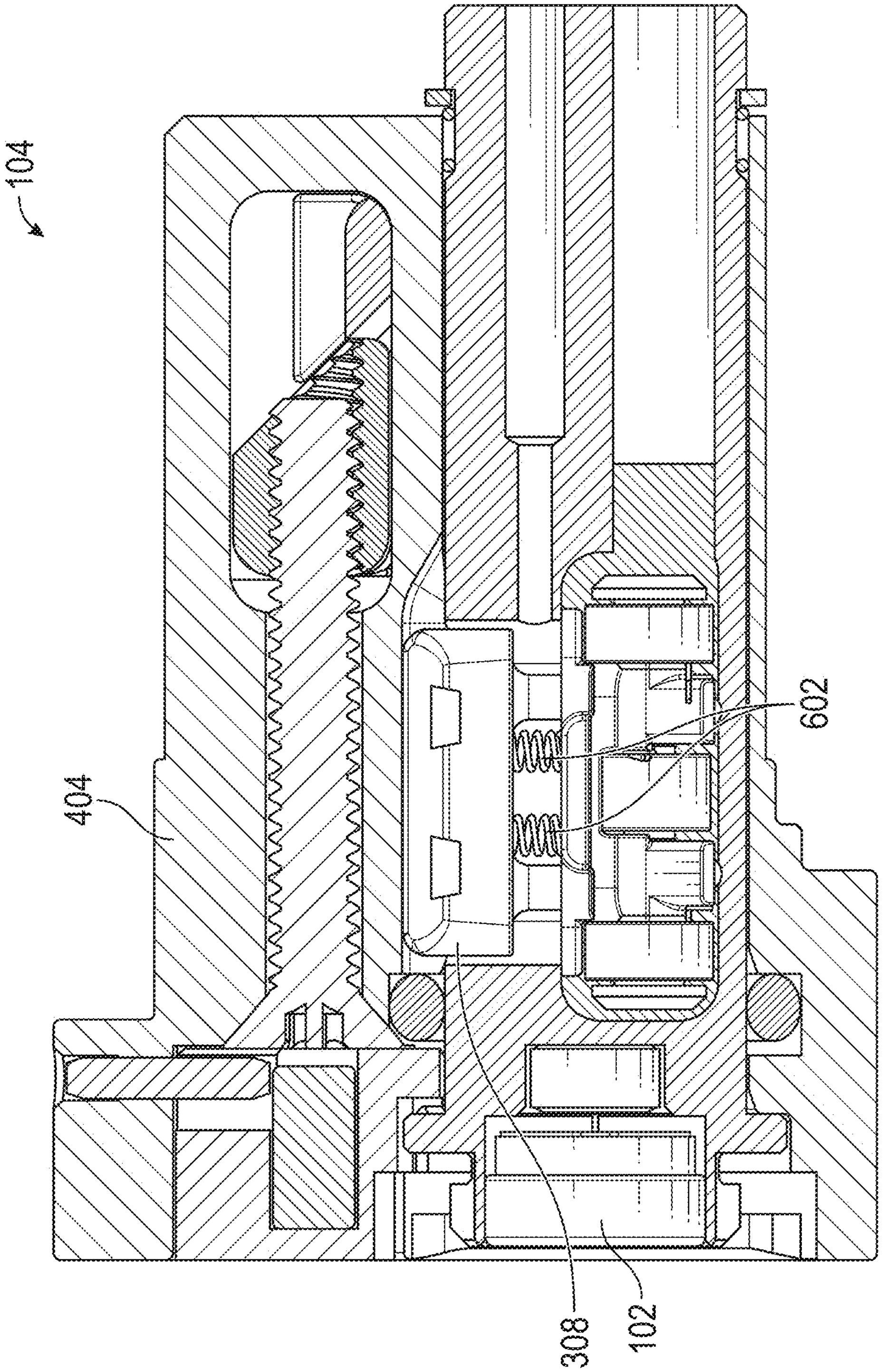
FIG. 6 illustrates a cross section of the electronic lock of FIG. 1 in a locked state with the cam lock protruding from the electronic lock core in accordance with certain embodiments disclosed herein.

FIG. 6 illustrates a cross section of the electronic lock core 104 of FIG. 1 in a locked state with the cam lock 308 protruding from the electronic lock core plug 102 in accordance with certain embodiments disclosed herein. The electronic lock core plug 102 includes a pair of magnets 602 (within the illustrated springs) that are repelled from the center of the electronic lock core plug 102 causing the cam lock 308 to protrude from the electronic lock core plug 102 when the electronic lock 100 is in a locked state. As illustrated with respect to FIG. 4, the protrusion of the cam lock 308 prevents the electronic lock core plug 102 from being rotated and accordingly, prevents alignment of the notch 502 of the flange 304 with the protrusion 306 of the screw guard 204. When the screw guard 204 cannot be removed, access to the screw 310 cannot be obtained and this the retainment assembly cannot be accessed to release or eject the electronic lock core 104. Thus, when the electronic lock 100 is in a locked state, the electronic lock core 104 cannot be removed and security of the electronic lock core 104 is maintained.

Figure 7:
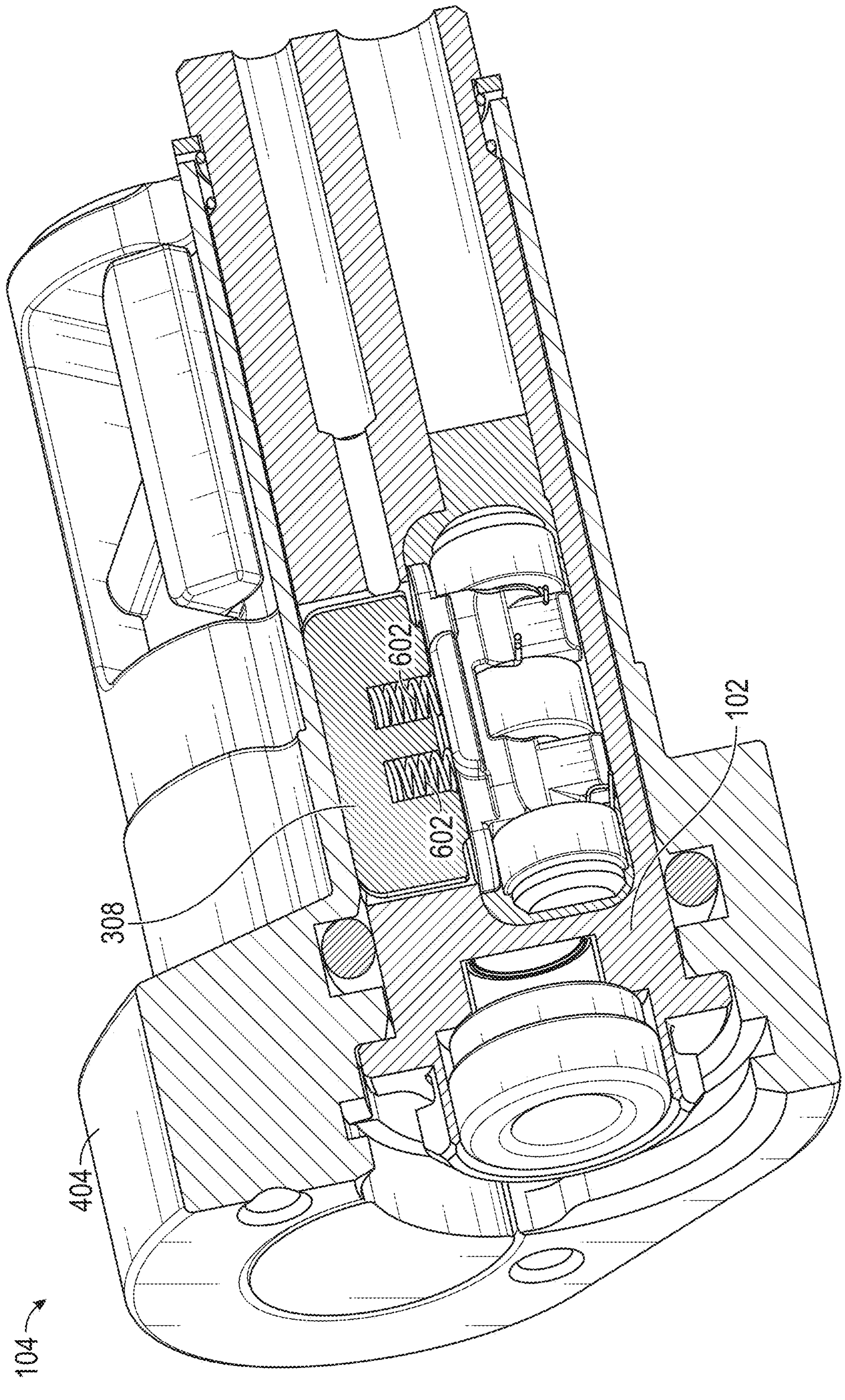
FIG. 7 illustrates a cross section of the electronic lock of FIG. 1 in an unlocked state with the cam lock retracted into the electronic lock core in accordance with certain embodiments disclosed herein.

FIG. 7 illustrates a cross section of the electronic lock core 104 of FIG. 1 in an unlocked state with the cam lock 308 retracted into the electronic lock core plug 102 in accordance with certain embodiments disclosed herein. When the electronic lock 100 is unlocked, the magnets 602 are attracted to the center of the electronic lock core plug 102, and the cam lock 308 is retracted within the electronic lock core plug 102. As illustrated with respect to FIG. 5, upon the cam lock 308 retracting inside the electronic lock core plug 102. the electronic lock core plug 102 is capable of being rotated and accordingly, alignment of the notch 502 of the flange 304 with the protrusion 306 of the screw guard 204 can be achieved. Thus, when the electronic lock 100 is in an unlocked state, the screw guard 204 can be removed and access to the screw 310 of the retainment assembly can be achieved enabling removal of the electronic lock core 104 as will be described further herein.

Example Electronic Keys

Figure 8:
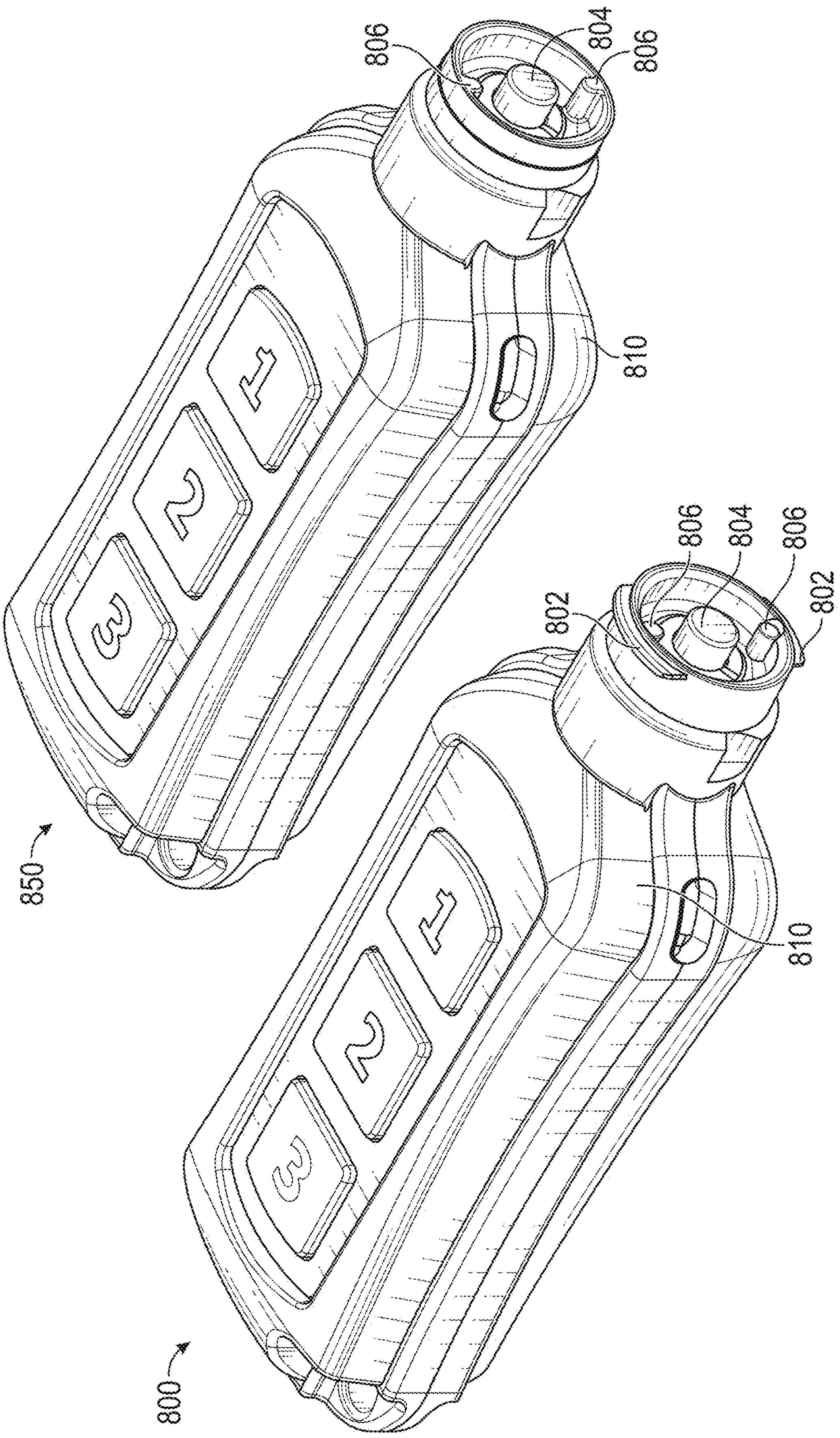
FIG. 8 illustrates a pair of example electronic keys in accordance with certain embodiments disclosed herein.

As has been described herein, the ability to access the retainment assembly that retains the electronic lock core 104 within an electronic lock housing of the electronic lock 100 may depend on the lock state of the electronic lock core 104 and/or the electronic lock 100. To transition the electronic lock core 104 and/or the electronic lock 100 between a locked state and an unlocked state, an electronic key may be used. FIG. 8 illustrates a pair of example electronic keys (the electronic key 800 and the electronic key 850) in accordance with certain embodiments. Unlocking the electronic lock core 104 and/or the electronic lock 100 may include accessing data and/or access control information from an electronic key.

In some embodiments, it is desirable for the electronic key to be unremovable from the electronic lock 100 when the electronic lock core 104 and/or the electronic lock 100 is in an unlocked state. For example, to prevent the electronic key from being misplaced, or to reduce the possibility that a location or device that is secured by the electronic lock 100 is left unsecured, it may be desirable that the electronic key is secured to the electronic lock 100 when the electronic lock 100 is in an unlocked state.

The electronic key 800 may include one or more retention tabs 802 that secure the electronic key 800 to the electronic lock 100 when the electronic lock 100 is in an unlocked state. For example, when using the electronic key 800, a user may insert a nose 804 of the electronic key 800 into a cup of the electronic lock core plug 102 that is configured to receive the nose 804. To insert the nose 804 into the cup of the electronic lock core plug 102, extensions 806 of the electronic key 800 are aligned with recesses 208 within the electronic lock core plug 102. To unlock the electronic lock 100 the electronic key 800 is rotated. And when the electronic key 800 is rotated, the one or more retention tabs 802 may engage with corresponding tabs in the electronic lock core plug 102 preventing the electronic key 800 from being removed from the electronic lock 100 and/or the electronic lock core 104. In some cases, the electronic key 800 can only be rotated within the electronic lock core plug 102 when it is determined that the electronic key 800 is authorized to unlock the electronic lock 100. In other cases, the electronic key 800 can be rotated within the electronic lock core plug 102 prior to the electronic lock 100 determining whether the electronic key 800 is authorized to unlock the electronic lock 100, but the electronic lock 100 will not unlock until it is determined that the electronic key 800 is authorized to unlock the electronic lock 100.

Advantageously, in some embodiments, when the electronic key 800 is inserted into the electronic lock core plug 102 and rotated such that the one or more retention tabs 802 are secured, the shoulder 810 of the electronic key 800 may provide an additional barrier to removal of the screw guard 204. For example, in some cases, the shoulder 810 may be aligned with the screw guard 204 when the electronic key 800 is inserted into the electronic lock core plug 102 and rotated to an unlock position, thereby preventing removal of the screw guard 204. Accordingly, in some cases, even when the electronic lock 100 is unlocked, the screw guard 204 may still be unremovable as the shoulder 810 of the electronic key 800 may prevent removal of the screw guard 204, and the one or more retention tabs 802 may prevent removal of the electronic key 800 from the electronic lock core plug 102 while the electronic lock 100 is unlocked. Further, as the one or more retention tabs 802 prevent removal of the electronic key 800 from the electronic lock 100 when the electronic lock 100 is unlocked, in some cases the electronic lock core 104 may be secured within the electronic lock 100 both when the electronic lock 100 is locked and when the electronic lock 100 is unlocked.

In some such embodiments, the electronic lock core 104 may not be removed or ejected while the electronic key is in use. Further, the electronic lock core 104 may not be removed or ejected unless the electronic lock 100 is unlocked. And the electronic key 800 cannot be removed unless the electronic lock 100 is locked. Accordingly, in certain embodiments, a particular electronic key designed for removal of the electronic lock core 104 is used to enable removal or replacement of the electronic lock core 104. This particular electronic key, of which the electronic key 850 is one non-limiting example, and which may be referred to as a "control key" herein, can be used to facilitate replacement of the electronic lock core 104.

The electronic key 850 may include some or all of the features described with respect to the electronic key 800 but may exclude the one or more retention tabs 802. Thus, the electronic key 850 may be removed from the electronic lock 100 when the electronic lock 100 is unlocked enabling removal of the screw guard 204 and access to the screw 310 that may be used to remove the electronic lock core 104 as described further herein.

Both the electronic key 800 and the electronic key 850 may be capable of unlocking the electronic lock 100. When either electronic key is inserted (e.g., a nose 804 of the electronic key mates with a cup 206 of the electronic lock core plug 102) into the electronic lock, it may be determined whether the electronic key is authorized to unlock the electronic lock. The determination of whether the electronic key is authorized to unlock the electronic lock may be based at least in part on data transferred between the electronic key and the electronic lock when the electronic key mates with the electronic lock.

In some embodiments, the electronic key 850 may differ in functionality from the electronic key 800. For example, in some embodiments, the electronic key 850 may be configured to permit replacement of the electronic lock core 104 without unlocking a device or location secured by the electronic lock 100. In some such embodiments, upon determining that the electronic key 850 is mated with the electronic lock core plug 102 of the electronic lock core 104, the electronic lock 100 may permit rotation of the electronic lock core plug 102 as part of the electronic lock core replacement process described herein while preventing unlocking of the electronic lock 100. Rotation of the electronic lock core plug 102 without unlocking of the electronic lock 100 may occur, for example, by retracting a portion of the electronic lock core 104 that interacts with a mechanical locking mechanism of the electronic lock 100, such as a lock tab, such that the mechanical locking mechanism is not modified by the rotation of the electronic lock core plug 102. The locking mechanism of the electronic lock 100 may include any type of locking mechanism including, for example, a padlock, a cabinet lock, a deadbolt, a mortise lock, a deadlatch, a latch, a cam lock, a knob lock, or any other type of mechanical mechanism that can secure a device or door.

Example Retainment Assembly

Figure 9:
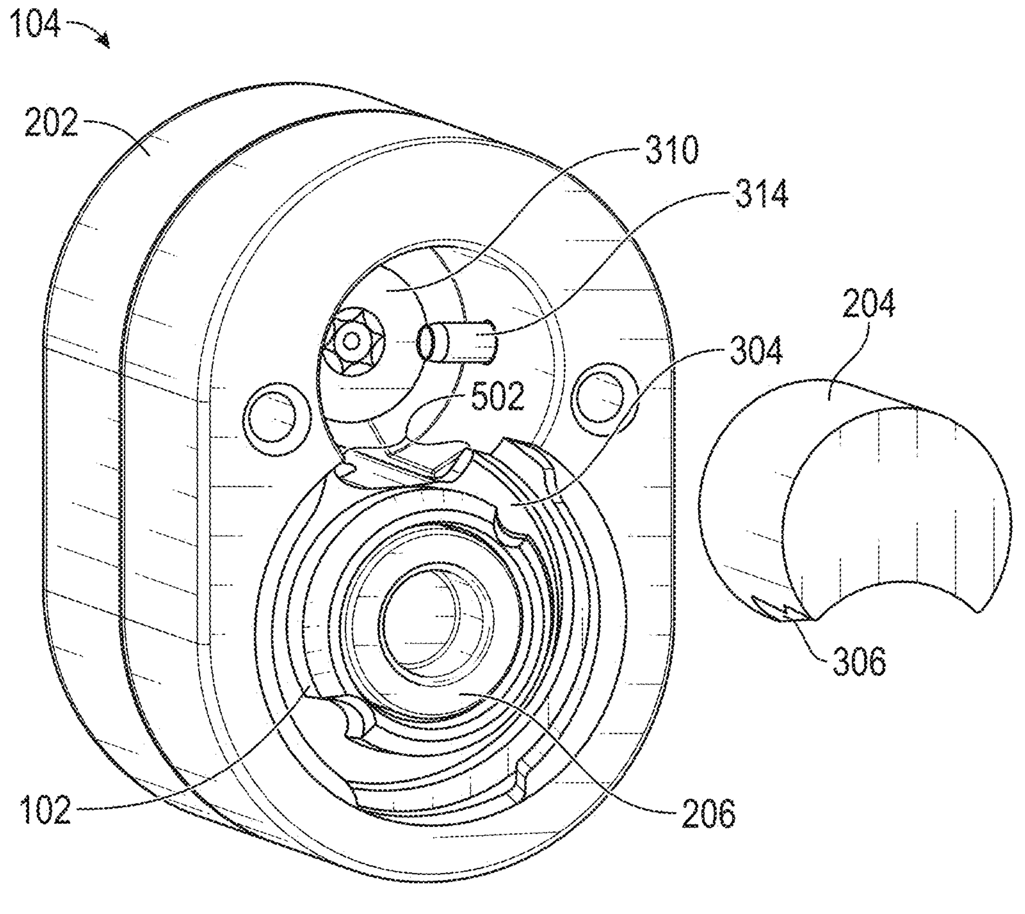
FIG. 9 illustrates removal of a screw guard of the electronic lock of FIG. 1 in accordance with certain embodiments disclosed herein.

As described above, the retainment assembly of the electronic lock core 104 is secured by a combination of features of the electronic lock core 104 including the screw guard 204, which is secured by the electronic lock core plug 102 and the electronic key 800. The retainment assembly may secure or retain the electronic lock core 104 within an electronic lock housing of the electronic lock 100. Further, as described above, use of a control key, such as the electronic key 850 enables the screw guard 204 to be removed from the electronic lock core 104. FIG. 9 illustrates removal of a screw guard 204 of the electronic lock core 104 of FIG. 1 in accordance with certain embodiments disclosed herein. FIG. 9 further illustrates the electronic lock core 104 inserted into or in combination with the spacer 202, which may facilitate attaching the electronic lock core 104 to a housing (e.g., the electronic lock housing) to house the electronic lock core 104 and enable attachment of the electronic lock core 104 to a device (e.g., a safe, a door, a lockbox, a medical cabinet, a shipping container, etc.) to be secured. In some cases, the housing may be integral to the device to be secured. In other cases, the housing, with the electronic lock core 104, may be affixed or attached to a device to be secured.

As previously described, and as illustrated in FIG. 9, upon alignment of the notch 502 of the flange 304 of the electronic lock core plug 102 with the protrusion 306 of the screw guard 204, the screw guard 204 can be removed from the electronic lock core 104. In some embodiments, the electronic key 850 may include a magnet that can be used to remove the screw guard 204 from the screw access port (e.g., a cup or space of the electronic lock core 104 that houses or holds the screw guard 204). The magnet of the electronic key 850 can attach to metal of the screw guard 204 enabling a user to pull the screw guard 204 from the electronic lock core 104 (or the electronic lock core shell 404) of the electronic lock core 104. Generally, the magnetic strength of the magnet of the electronic key 850 is greater than the magnetic strength of the magnet 312 of the screw guard 204 that keeps the screw guard 204 affixed to the screw 310 enabling a user to overcome the magnetic attraction between the screw guard 204 and the screw 310 when attempting to remove the screw guard 204 from the electronic lock core shell 404 of the electronic lock core 104. It should be understood that, in some cases, any magnet with a greater magnetic strength than the magnet 312 included in the screw guard 204 can be used to remove the screw guard 204 from the electronic lock core 104 and that, in some such cases, use of the electronic key 850 to remove the screw guard 204 from the electronic lock core 104 may be optional.

In some cases, the magnet of the electronic key 850 may be of opposite polarity than the magnet 312. In some such cases, attraction between the magnet of the electronic key 850 and the magnet 312 may be used to help remove the screw guard 204 from the electronic lock core 104.

Once the screw guard 204 is removed, access to the screw 310 is obtained. The screw 310 may serve as the interface element of the retainment assembly that enables a user to interact with the retainment assembly. As is described further herein, the retainment assembly may be used to retain the electronic lock core 104 within the electronic lock 100. In some cases, the retainment assembly may be used to retain the electronic lock core plug 102 of the electronic lock core 104 within the electronic lock core 104 or the electronic lock 100. The retainment assembly may also be used to eject the electronic lock core 104 enabling the electronic lock core 104 to be replaced by another electronic lock core. In some cases, the retainment assembly may be used to eject the electronic lock core plug 102 of the electronic lock core 104 from the electronic lock core 104 or the electronic lock 100. In some cases, the screw 310 may be part of the retainment assembly. As can be seen in FIG. 9, the pin 314 may also be visible upon removal of the screw guard 204. As previously described, the pin 314 may prevent the screw 310 from being removed or over loosened. It should also be understood, as can be seen by comparing FIG. 3A and FIG. 9, that the location of the pin 314 is not limited to a particular location within the electronic lock core 104 but may be positioned at any location that can prevent removal of the screw 310 from the electronic lock core 104.

Figure 10:
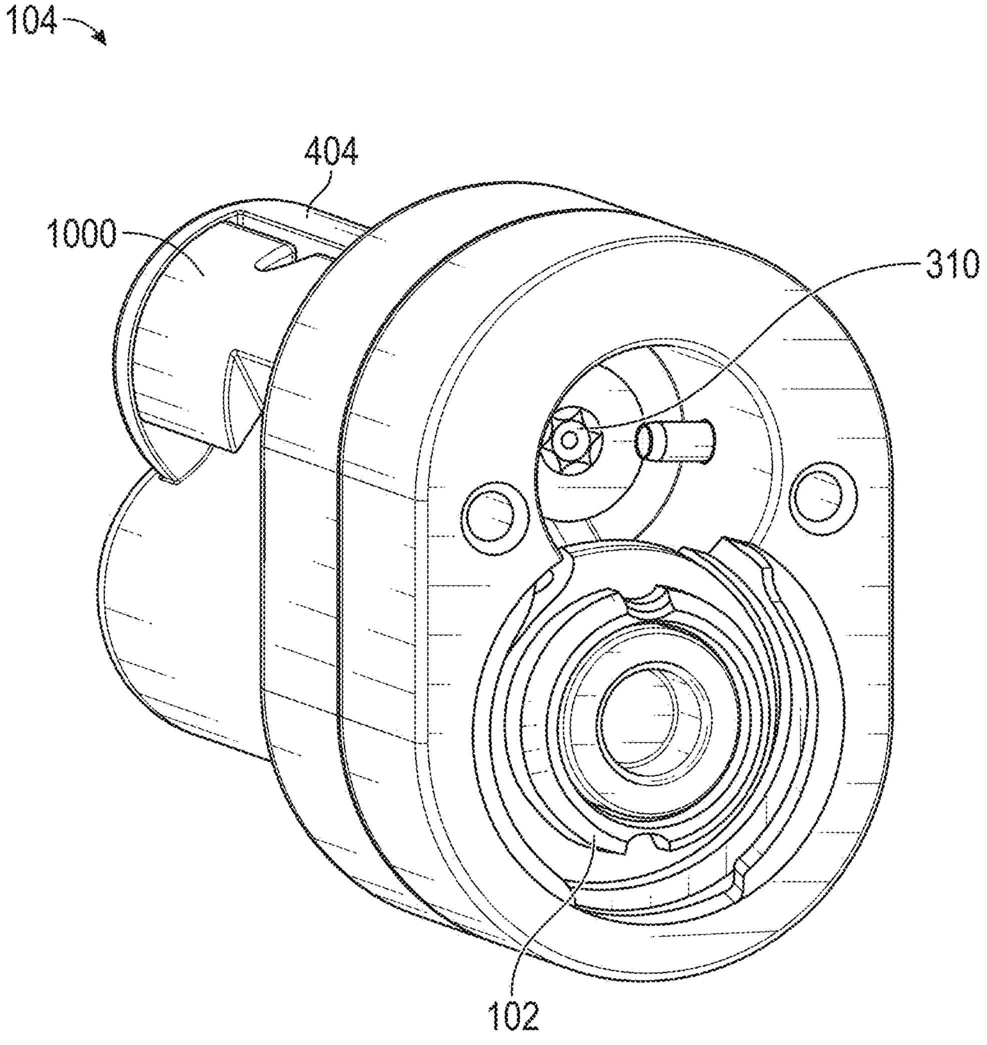
FIG. 10 illustrates a control lug of a retainment assembly of the electronic lock of FIG. 1 in accordance with certain embodiments disclosed herein.

FIG. 10 illustrates a control lug 1000 of a retainment assembly of the electronic lock core 104 of FIG. 1 in accordance with certain embodiments disclosed herein. The control lug 1000 secures the electronic lock core 104 to the electronic lock 100, or to an electronic lock housing (not shown) of the electronic lock 100. More specifically, the control lug 1000 secures the electronic lock core 104 to a housing (not shown) of the electronic lock 100. The control lug 1000 secures the electronic lock core 104 to the housing of the electronic lock 100 when the control lug 1000 engages or is in contact with a portion of the electronic lock core shell 404 that houses the electronic lock core plug 102 and enables removal of the electronic lock core 104 when the control lug 1000 disengages from the portion of the electronic lock core shell 404 that houses the electronic lock core plug 102 or is moved to the top of the electronic lock core shell 404 and away from the electronic lock core plug 102. In some cases, when the control lug 1000 disengages from the portion of the electronic lock core shell 404 that houses the electronic lock core plug 102 or is moved to the top of the electronic lock core shell 404 and away from the electronic lock core plug 102, the electronic lock core plug 102 can be removed from the electronic lock core 104 or the electronic lock 100. In other cases, the electronic lock core plug 102 cannot be separately removed from the electronic lock 100 and is removed in combination with the electronic lock core 104.

A position of the control lug 1000 may be controlled by the screw 310. Tightening (or turning clockwise) the screw 310 may cause the control lug 1000 to engage with a portion of the electronic lock core shell 404 that houses the electronic lock core plug 102 and retain the electronic lock core 104 within a housing (not shown) of the electronic lock 100. The electronic lock core 104 is a Small Format Interchangeable Core (SFIC). As is explained in more detail herein, when the control lug 1000 engages with a portion of the electronic lock core shell 404 that houses the electronic lock core plug 102 (or descends to a bottom of a retainer ramp that moves the control lug 1000), a shape of the electronic lock core 104 no longer conforms to a shape of the SFIC. The control lug 1000 becomes an obstruction that prevents removal of the electronic lock core 104 from an aperture of an electronic lock 100 shaped to house an SFIC. Accordingly, the electronic lock core 104 is secured and cannot be removed when the control lug 1000 descends to a portion of the electronic lock core shell 404 that houses the electronic lock core plug 102. Although primarily described with respect to an SFIC, embodiments disclosed herein can be used with other types of lock cores that can be replaced within a lock.

Loosening (or turning counterclockwise) the screw 310 may disengage the control lug 1000 from a portion of the electronic lock core shell 404 that houses the electronic lock core plug 102 (or ascends to a top of a retainer ramp that moves the control lug 1000) enabling the electronic lock core 104 to be removed or ejected from a housing of the electronic lock 100. When the control lug 1000 is disengaged from the portion of the electronic lock core shell 404 that houses the electronic lock core plug 102 and raised towards the top of the electronic lock core 104, the shape of the electronic lock core 104 once again conforms with the shape of an SFIC and can be removed from a housing of the electronic lock 100. Once the electronic lock core 104 is removed, it may be serviced and/or replaced by another electronic lock core, which may be of the same type or of a different type (e.g., upgraded with different/newer features, or produced by a different manufacturer, etc.). It should be understood that tightening or loosening of the screw 310 is selected by convention. It is possible for the electronic lock core 104 to be configured such that turning the screw 310 clockwise disengages the control lug 1000 and that turning the screw 310 counterclockwise engages the control lug 1000 with the electronic lock core plug 102.

Figure 11:
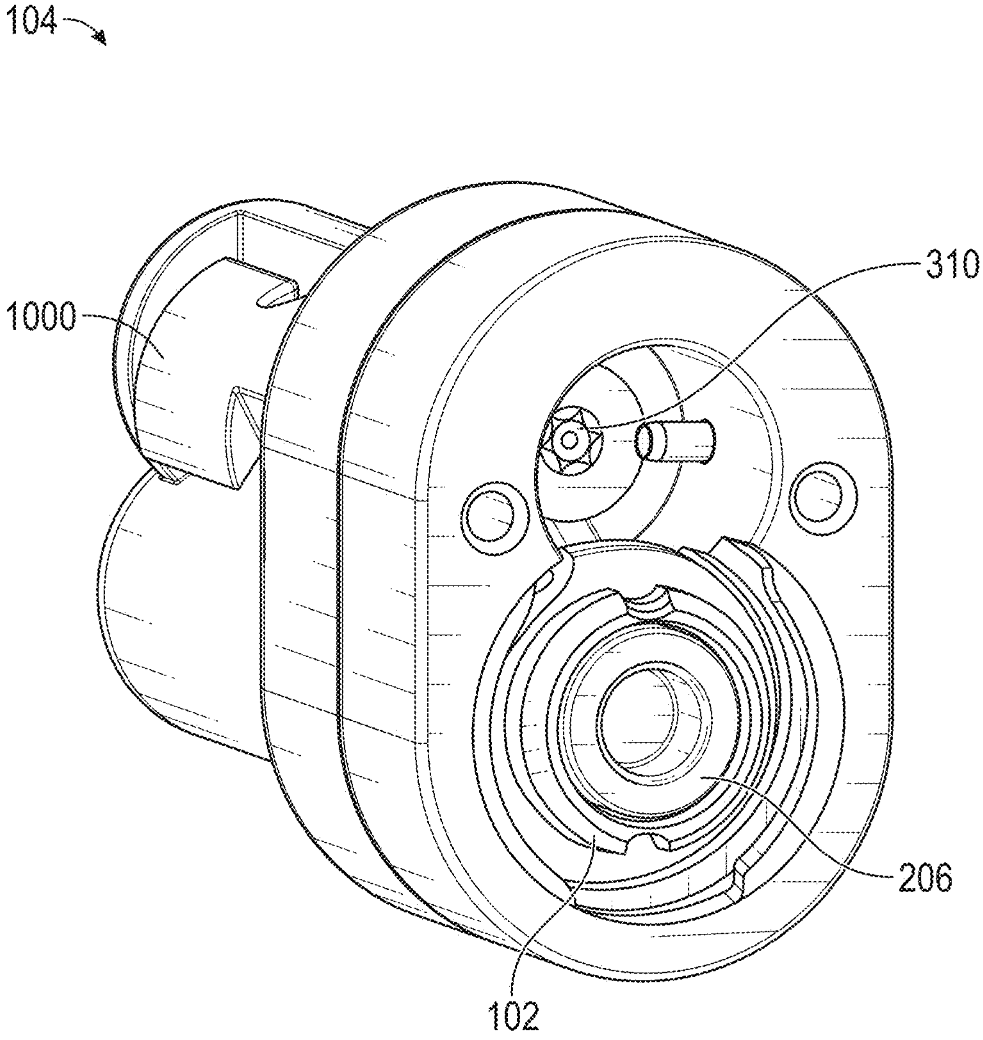
FIG. 11 illustrates use of a screw to lower the control lug of FIG. 10 in accordance with certain embodiments disclosed herein.

FIG. 11 illustrates use of the screw 310 to lower the control lug 1000 of FIG. 10 in accordance with certain embodiments disclosed herein. As can be seen by comparing FIG. 10 and FIG. 11, as the screw 310 is turned clockwise, or tightened, the control lug 1000 may be lowered towards the portion of the electronic lock core shell 404 that houses the electronic lock core plug 102 enabling the control lug 1000 to modify the shape of the electronic lock core 104 and to retain the electronic lock core 104 within the electronic lock housing of the electronic lock 100. When lowered, the control lug 1000 may descend linearly towards the electronic lock core plug 102 of the electronic lock core 104. In some cases, the control lug 1000 may move in a different manner. For example, in some cases, the control lug 1000 may move linearly or down towards the electronic lock core plug 102 for a portion of its travels and then may move forwards towards a face of the electronic lock core 104 for a portion of its travels. In other words, in some cases, the control lug 1000 may move in an "L" type pattern, first descending towards the electronic lock core plug 102 and then moving forwards towards a face (e.g., towards the cup 206) of the electronic lock core plug 102. Advantageously, the movement in an "L" type pattern enables the control lug 1000 to engage not only a portion of the electronic lock core shell 404 that houses the electronic lock core plug 102, but also to engage with a portion of the electronic lock housing (as described more herein) of a lock configured to accept or house an SFIC (e.g., the electronic lock core 104). Advantageously, in certain embodiments, by engaging the housing of the electronic lock 100, the control lug 1000 is able to reduce or eliminate rattling or movement of the electronic lock core 104 within the housing of the electronic lock 100.

Figure 12:
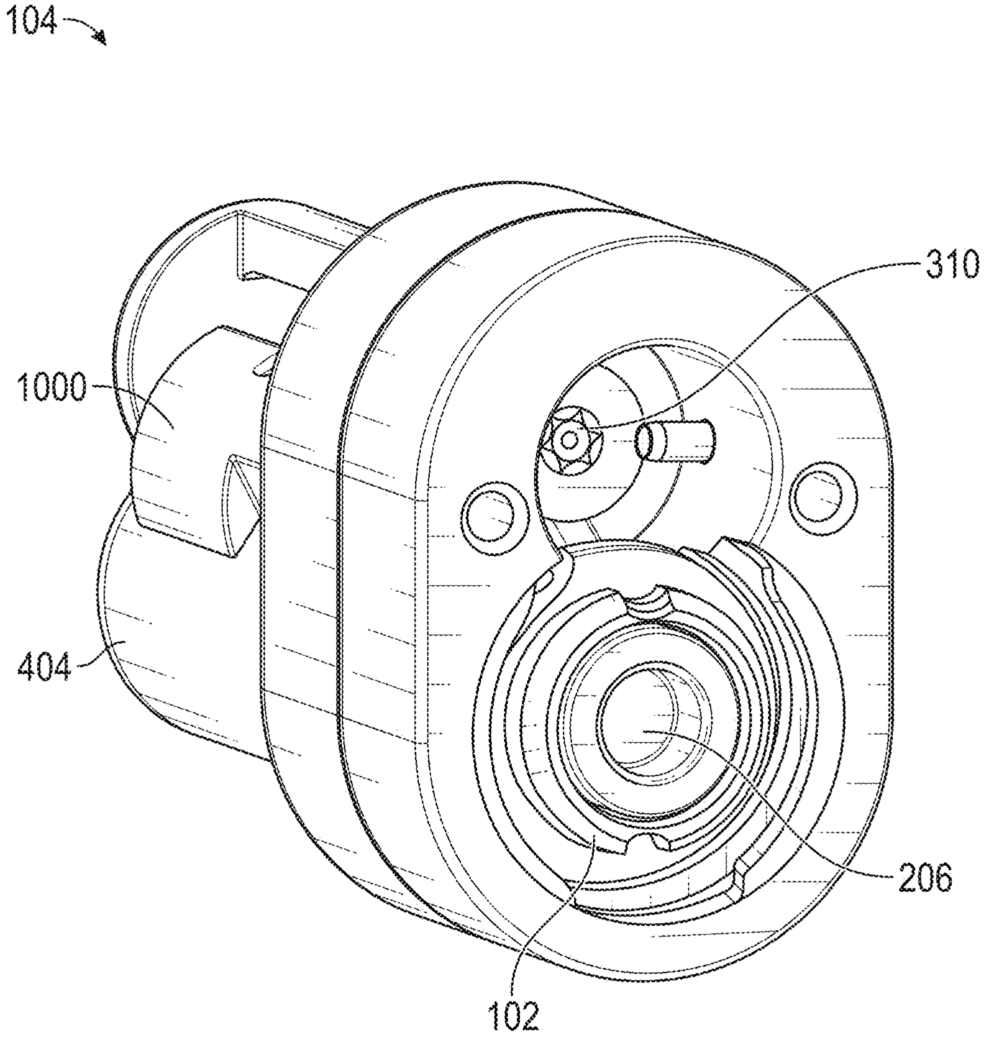
FIG. 12 illustrates engagement of the control lug of FIG. 10 with the electronic lock core in accordance with certain embodiments disclosed herein.

FIG. 12 illustrates the engagement of the control lug 1000 with the portion of the electronic lock core shell 404 that houses the electronic lock core plug 102. Once the control lug 1000 has descended towards the portion of the electronic lock core shell 404 that houses the electronic lock core plug 102, the electronic lock core 104 may no longer satisfy the SFIC form factor and is held within a housing of the electronic lock 100 and is unremovable. Further, the engagement of the control lug 1000 with the electronic lock housing reduces or eliminates movement of the electronic lock core 104 within the electronic lock 100 as may occur due to manufacturing tolerances or wear and tear of materials over time. In some embodiments, the control lug 1000 may prevent or reduce movement of the electronic lock core 104 in one or more of an axial direction, a lateral direction, an angular direction, or a rotational direction. Although the present disclosure describes an electronic lock core 104 that has an SFIC form factor and that may be inserted into a lock configured to support an SFIC form factor, it should be understood that embodiments of the present disclosure may be used with other form factors. For example, the electronic lock core 104 may have any type of form factor and may be inserted into a corresponding lock configured to house the form factor of the electronic lock core 104. Further, the form factor of the electronic lock core 104 may be modified using, for example, the control lug 1000 such that the electronic lock core 104 is retained within the housing of the lock when the form factor of the electronic lock core 104 is modified.

Figure 13:
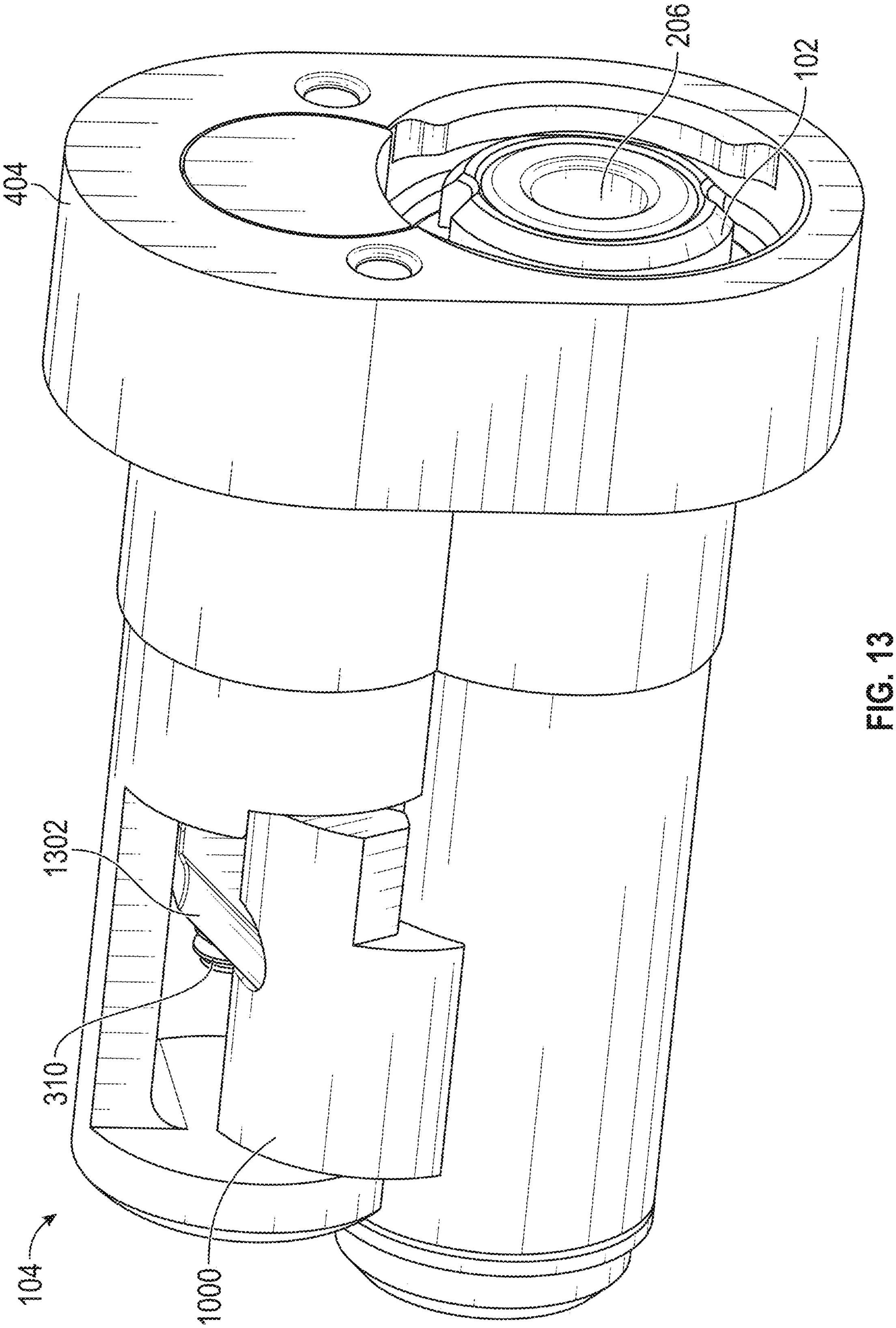
FIG. 13 illustrates another view of the engagement of the control lug of FIG. 10 with the electronic lock core and a retainer ramp in accordance with certain embodiments disclosed herein.

FIG. 13 illustrates another view of the engagement of the control lug 1000 of FIG. 10 with the portion of the electronic lock core shell 404 that houses the electronic lock core plug 102 and a retainer ramp 1302 in accordance with certain embodiments disclosed herein. The retainer ramp 1302 forms a portion of the retainment assembly. More specifically, the combination of the screw 310, the control lug 1000 and the retainer ramp 1302 may form the retainment assembly. In some embodiments, one or more of the screw guard 204, the pin 314, and/or the magnet 312 may be considered part of the retainment assembly. In other embodiments, the retainment assembly may be separate from the screw guard 204, the pin 314, and/or the magnet 312.

The screw 310 is threaded through the retainer ramp 1302. Accordingly, the retainer ramp 1302 may guide the control lug 1000 by rotating the screw 310. When the screw 310 is tightened or turned clockwise, the screw 310 may cause the retainer ramp 1302 to lower the control lug 1000 towards the electronic lock core plug 102. In some cases, the retainer ramp 1302 may also push the control lug 1000 towards the front of electronic lock core plug 102 (e.g., in the direction of the cup 206). In contrast, when the screw 310 is loosened or turned counterclockwise, the retainer ramp 1302 may guide the control lug 1000 away from the cup 206 and raise the control lug 1000 above or away the electronic lock core plug 102 and towards a top portion of the electronic lock core shell 404.

Figure 14:
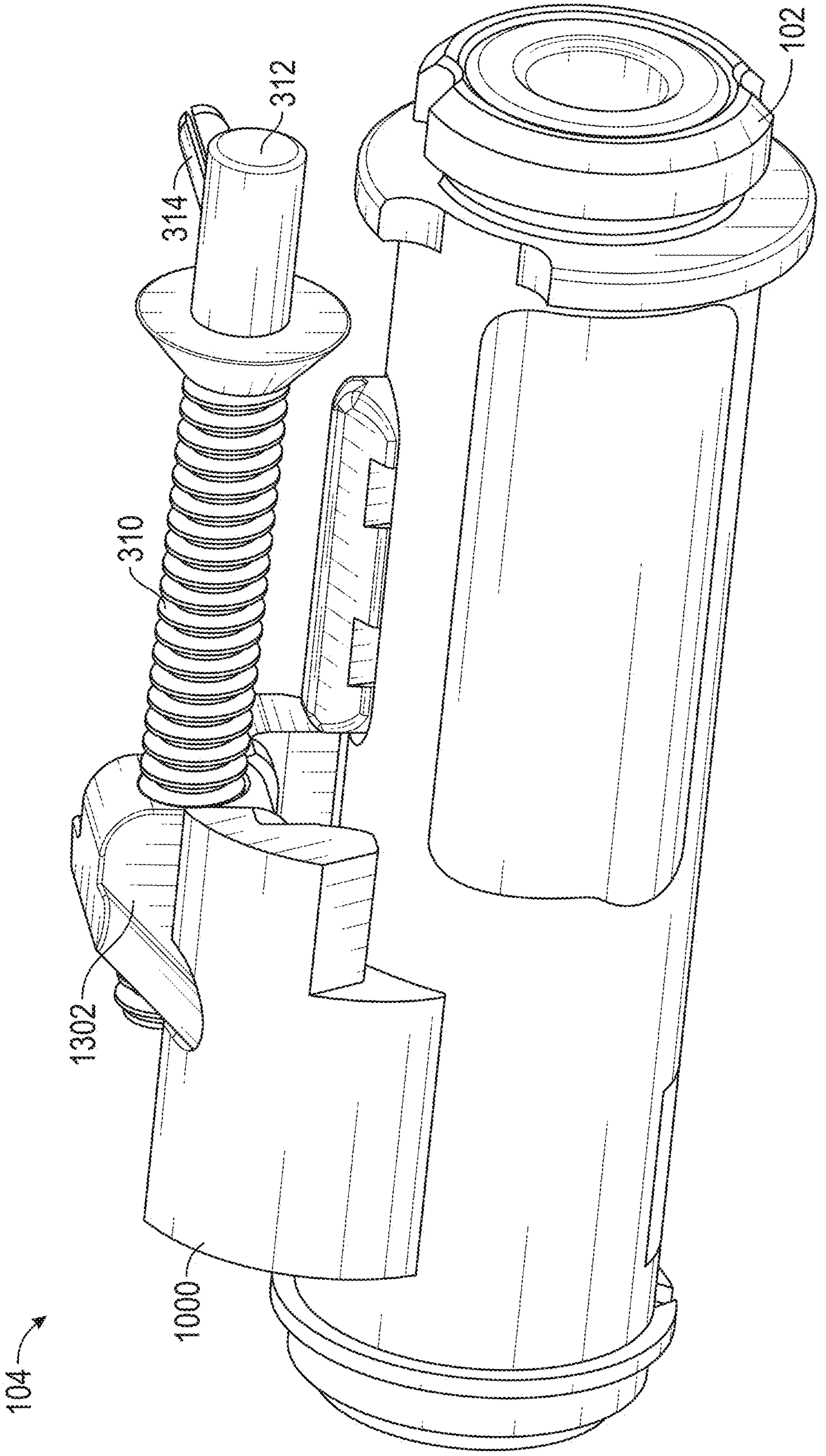
FIG. 14 illustrates the electronic lock core and the retainment assembly of the electronic lock of FIG. 1 in accordance with certain embodiments disclosed herein.

FIG. 14 illustrates the electronic lock core plug 102 and the retainment assembly of the electronic lock core 104 of FIG. 1 in accordance with certain embodiments disclosed herein. As described herein, the screw 310 can be used to move the retainer ramp 1302 axially along the screw 310. As the retainer ramp 1302 moves away from the head of the screw 310, the control lug 1000 is moved or raised away from the electronic lock core plug 102 thereby, disengaging from the portion of the electronic lock core shell 404 that houses the electronic lock core plug 102 and restoring a shape of the electronic lock core 104 to that of the SFIC form factor, which thereby enables the electronic lock core 104 to be removed from the electronic lock 100. Further, when the control lug 1000 is disengaged, an electronic lock core may be inserted into the electronic lock 100 either during manufacture or during an electronic lock core replacement process.

FIG. 14 also illustrates the magnet 312 that may be used to hold the screw guard 204 in place when installed. Additionally, the pin 314 that prevents the screw 310 from being removed from the electronic lock core 104 and from being removed from the retainer ramp 1302 is also illustrated.

Figure 15:
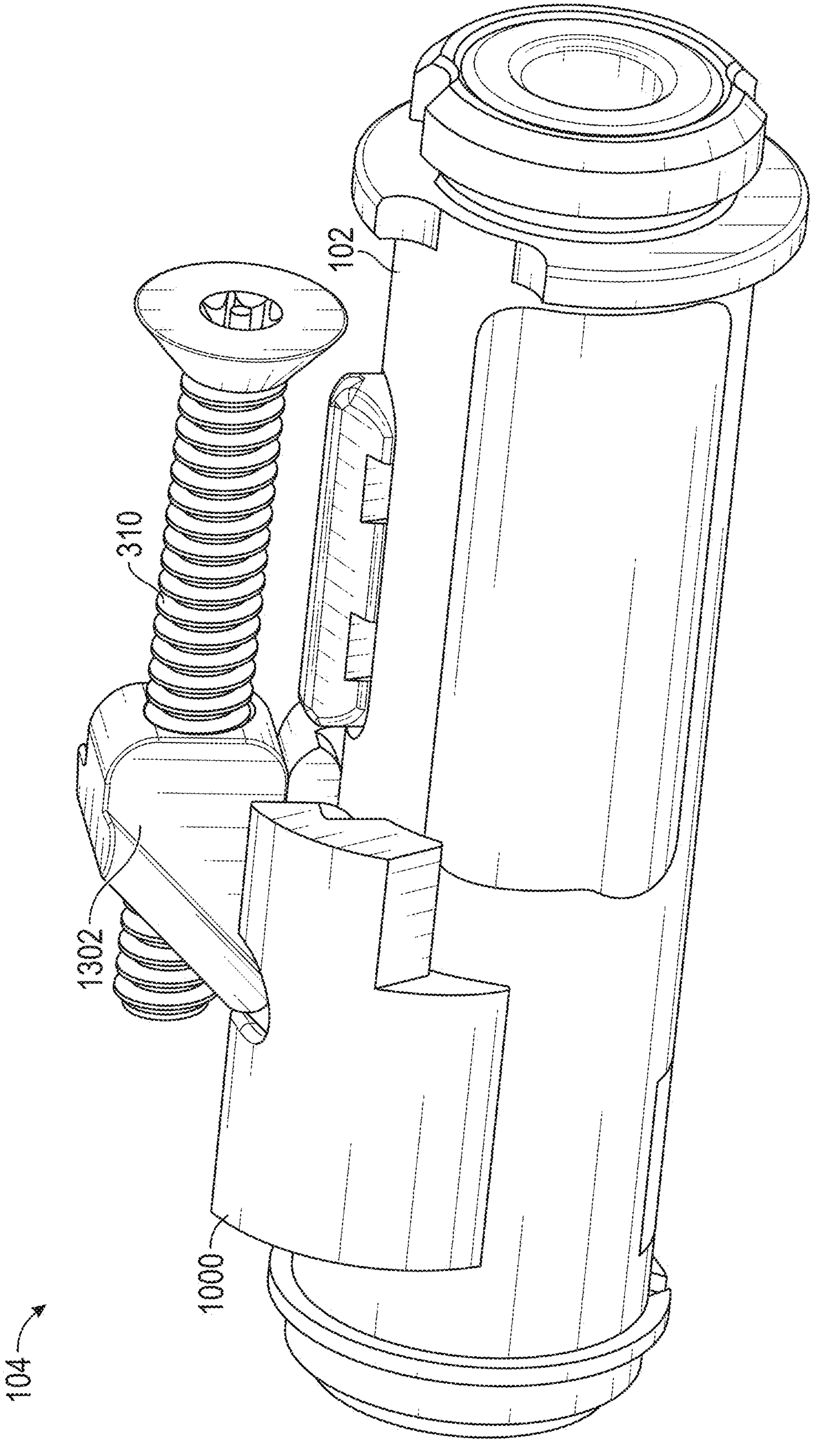
FIG. 15 illustrates the electronic lock core with the retainment assembly fully engaged with the electronic lock core in accordance with certain embodiments disclosed herein.

FIG. 15 illustrates the electronic lock core plug 102 of the electronic lock core 104 with the retainment assembly in a retainment configuration that retains the electronic lock core 104 within an electronic lock in accordance with certain embodiments disclosed herein. In FIG. 15, the control lug 1000 is in its lowest point and in some cases, may contact a portion of the electronic lock core shell 404 (not shown) that houses the electronic lock core plug 102. Further, the control lug 1000 at the illustrated height may make contact with a portion of the electronic lock housing of the electronic lock 100 preventing movement of the electronic lock core 104 within the electronic lock housing of the electronic lock 100. The control lug 1000 may abut against a protrusion or portion of the housing of the electronic lock 100 preventing movement of the electronic lock core 104 within the electronic lock 100. Advantageously, in certain embodiments, engagement of the control lug 1000 with the electronic lock housing can prevent loosening of the electronic lock core 104 within the electronic lock 100 due to vibrations that may occur when the electronic lock electronic lock 100 is installed in a mobile device (e.g., a medical cabinet in an emergency vehicle). Further, the engagement of the control lug 1000 with the electronic lock housing can prevent movement due to manufacturing tolerances or wear and tear of the electronic lock 100 due to use or weather conditions at a location where the electronic lock 100 is installed.

Figure 16:
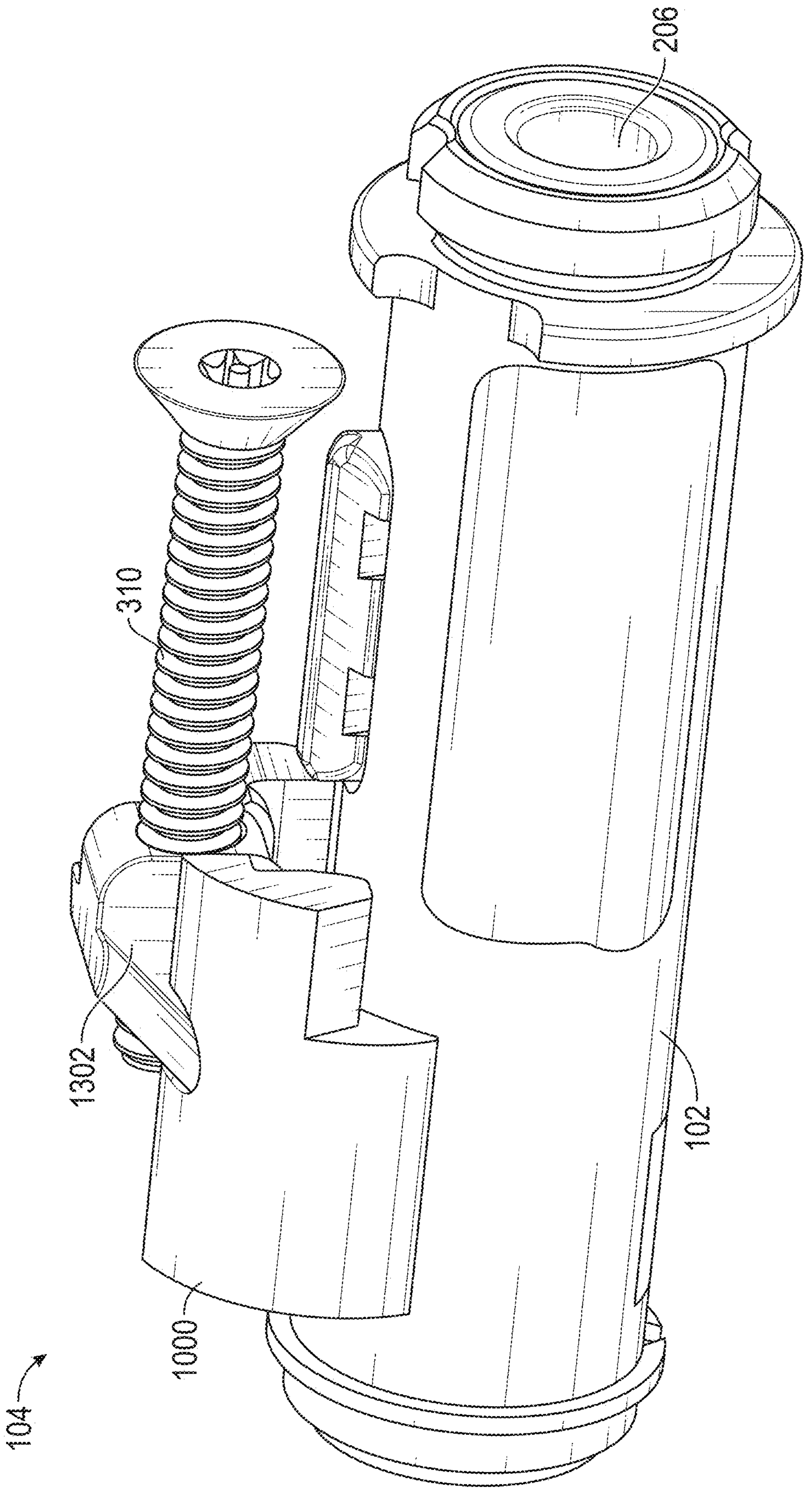
FIG. 16 illustrates the electronic lock core with the retainment assembly partially engaged, or partially disengaged, with the electronic lock core in accordance with certain embodiments disclosed herein.

FIG. 16 illustrates the electronic lock core plug 102 of the electronic lock core 104 with the retainment assembly with the control lug 1000 partially raised in accordance with certain embodiments disclosed herein. Comparing the position of the screw 310 with respect to the retainer ramp 1302 in FIG. 16 and FIG. 15, it can be seen that as the screw 310 is rotated counterclockwise, the head of the screw 310 axially moves further from the retainer ramp 1302 (e.g., as if attempting to remove the screw 310 from the retainer ramp 1302). Consequently, the control lug 1000 is lifted away from the electronic lock core plug 102 disengaging from the electronic lock housing (not shown) of the electronic lock 100. In contrast, as the screw 310 is rotated clockwise, the head of the screw 310 moves towards the retainer ramp 1302 (e.g., as if attempting to insert or screw the screw 310 into the retainer ramp 1302) causing the control lug 1000 to move down towards the portion of the electronic lock core shell 404 (not shown) that houses the electronic lock core plug 102 and to eventually engage with the electronic lock housing, thereby holding the electronic lock core 104 in position within the electronic lock 100. In some implementations, the retainer ramp 1302 may further cause the control lug 1000 to move towards the face (e.g., towards the cup 206) of the electronic lock core plug 102. Thus, the control lug 1000 may move diagonally as it descends. Alternatively, the control lug 1000 may first move down (e.g., linearly) towards the central axis of the electronic lock core plug 102 and then forwards (e.g., linearly) towards the face (e.g., towards the cup 206) of the electronic lock core plug 102. This movement pattern may be similar to a shape of an "L" or the movement of a knight piece in chess.

Figure 17:
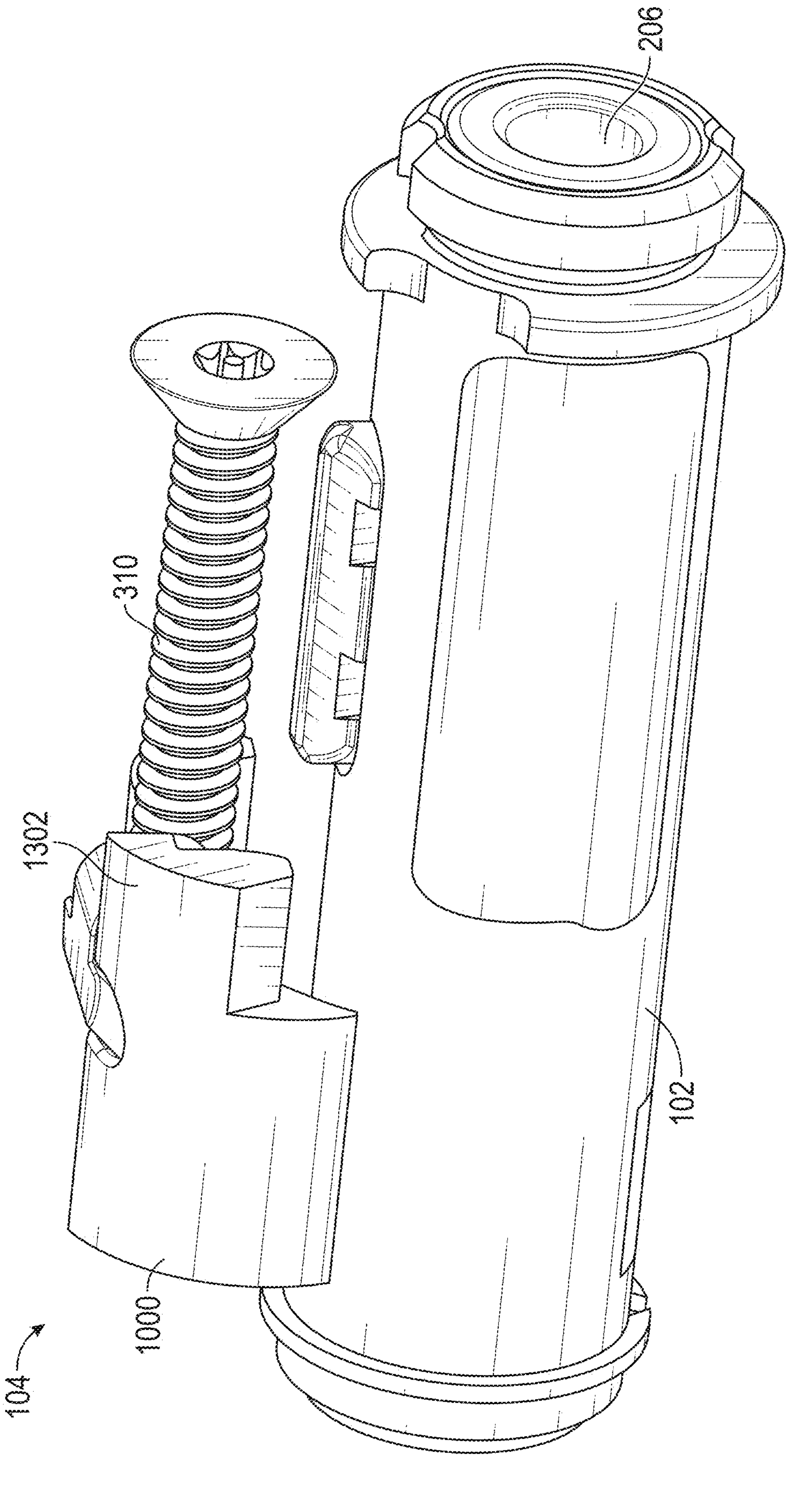
FIG. 17 illustrates the electronic lock core with the retainment assembly fully disengaged with the electronic lock core in accordance with certain embodiments disclosed herein.

FIG. 17 illustrates the electronic lock core plug 102 of the electronic lock core 104 with the control lug 1000 of the retainment assembly fully raised away from the electronic lock core plug 102 in accordance with certain embodiments disclosed herein. At this point illustrated in FIG. 17, the control lug 1000 is fully disengaged from the electronic lock housing and the electronic lock core 104 satisfies the SFIC form factor such that the electronic lock core 104 can be removed from the electronic lock 100 enabling replacement of the electronic lock core 104 as desired. The electronic lock core 104 may be removable from the housing of the electronic lock 100 because, for example, the full retraction or disengagement of the control lug 1000 causes the electronic lock core 104 to comply in shape with the SFIC form, thereby matching the aperture of the housing of the electronic lock 100 as is described further herein. As described above, the form factor may be any type of form factor that matches the form factor of the electronic lock 100 and the present disclosure is not limited to SFIC form factors.

As described herein, the electronic lock core plug 102 may be housed within an electronic lock core shell 404, or a portion of the electronic lock core shell 404. However, in some embodiments, the electronic lock core plug 102 may not include a separate housing. In such cases, the retainment assembly may cause the control lug 1000 to directly engage the electronic lock core plug 102.

Figure 18:
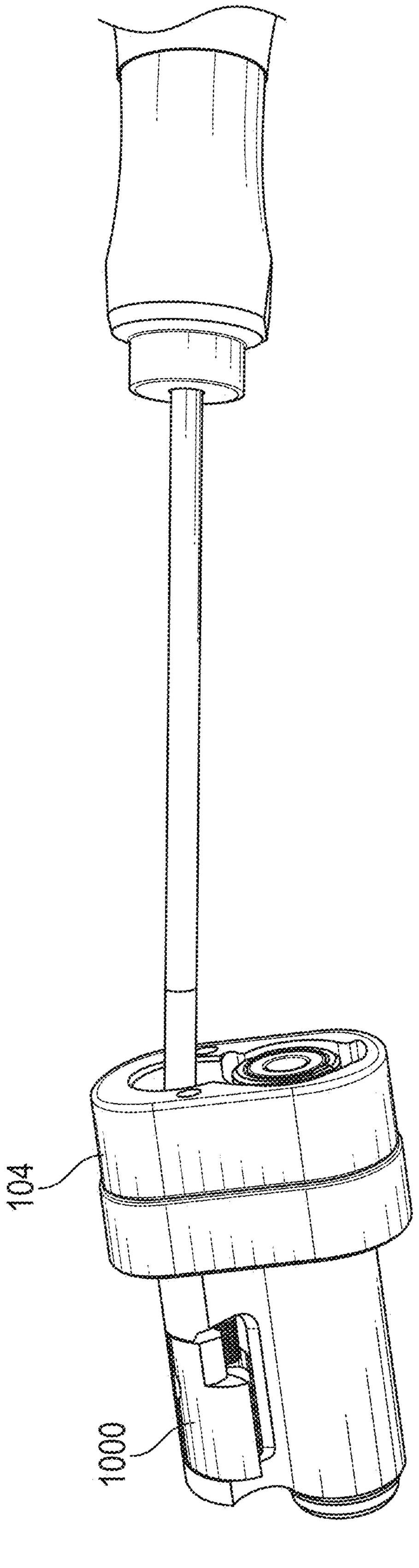
FIG. 18 depicts a photograph of a prototype of the electronic lock with the retainment assembly fully disengaged with the electronic lock core in accordance with certain embodiments disclosed herein.

FIG. 18 depicts a photograph of a prototype of the electronic lock core 104 with the retainment assembly fully disengaged and the control lug 1000 raised away from the electronic lock core plug 102 in accordance with certain embodiments disclosed herein. As can be seen in the photograph, a screwdriver can be used to raise the control lug 1000 away from the electronic lock core plug 102 by turning the screw 310.

Figure 19A:
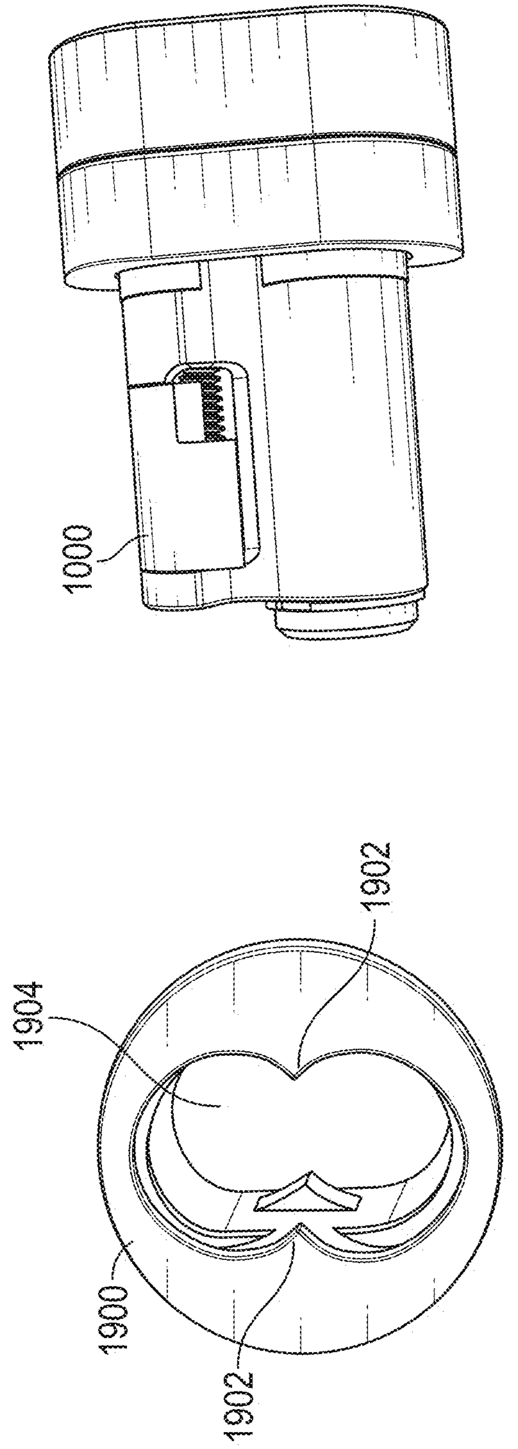
FIG. 19A depicts a photograph of a prototype of the electronic lock with the retainment assembly fully disengaged with the electronic lock core in accordance with certain embodiments disclosed herein.

FIG. 19A depicts a photograph of a prototype of the electronic lock core 104 with the retainment assembly fully disengaged such that the electronic lock core 104 satisfies the SFIC form factor in accordance with certain embodiments disclosed herein. Further, FIG. 19A depicts an electronic lock housing, or housing 1900, of an electronic lock 100 that can receive the electronic lock core 104, which may include the electronic lock core plug 102. The housing 1900 may be configured to house or otherwise receive the electronic lock core 104 and may be part of an electronic lock 100. The housing 1900 may include an aperture 1904 that is configured to receive the electronic lock core 104. When the electronic lock core 104 is inserted into an aperture 1904 of the housing 1900, the control lug 1000 may be in a raised state (e.g., as illustrated in FIG. 19A) enabling the electronic lock core 104 to be inserted into and or removed from the housing 1900. When the control lug 1000 is lowered, the control lug 1000 restricts movement of the electronic lock core 104 because, for example, the control lug 1000 may abut against one or more protrusions 1902 that extend from a side wall of the housing 1900 into the aperture 1904 of the housing 1900 that is configured to receive the electronic lock core 104. In some cases, the one or more protrusions 1902 may be latches or any other type of obstruction that extends into the aperture 1904 of the housing 1900. The protrusions 1902 may be part of the shape of the aperture 1904 that gives the housing 1900 the form factor or shape of a housing that supports a SFIC. It should be understood that other form factors for the housing 1900 are possible and that other form factors for the electronic lock core 104 are possible without deviating from embodiments of the present disclosure.

In some embodiments the electronic lock core 104 is a small format interchangeable core (SFIC). Further, the housing 1900 may be any type of housing that supports or is capable of housing a small format interchangeable core. In the illustrated example, the housing 1900 may be part of a mortice lock. In some cases, the movement of the control lug 1000 can change the shape of the SFIC to a non-SFIC shape, which may prevent removal of the SFIC.

Figure 19B:
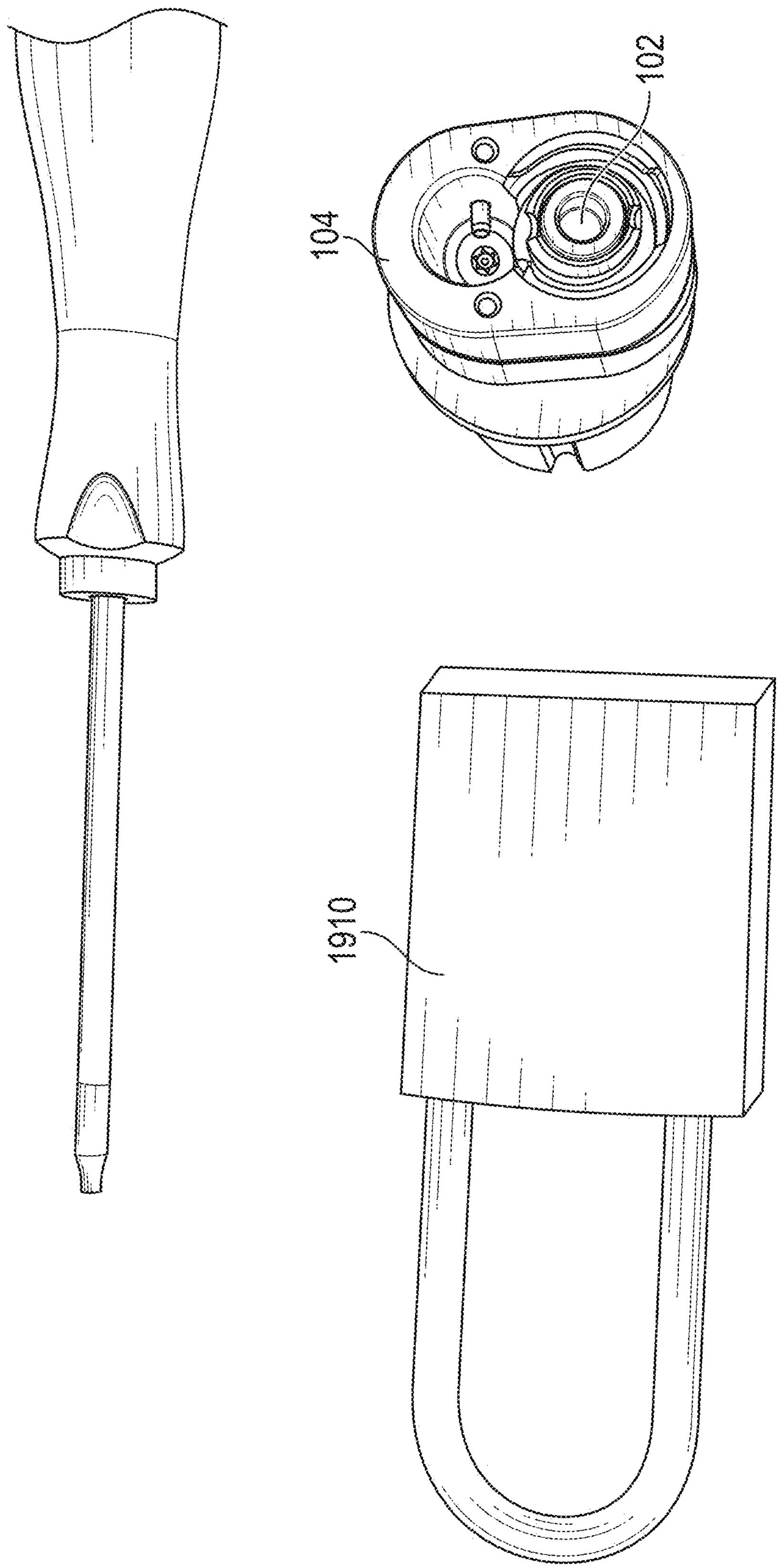
FIG. 19B depicts a photograph of a Small Format Interchangeable Core (SFIC) housing and an electronic lock core in accordance with certain embodiments disclosed herein.

FIG. 19B depicts a photograph of a second example of an electronic lock housing, or housing 1910, and an electronic lock core 104 in accordance with certain embodiments disclosed herein. The present disclosure is not limited by the type of housing that may be used to house the electronic lock core 104. In the example of FIG. 19B, the housing 1910 may be a padlock. However, it is also possible for the housing to be a mortise lock (e.g., the housing 1900), a cabinet lock, a cam lock, a deadbolt lock, or any other type of lock or housing that can house the electronic lock core 104. The electronic lock core 104 may be inserted into the housing 1910 and may be secured using one or more of the embodiments disclosed herein.

Figure 19C:
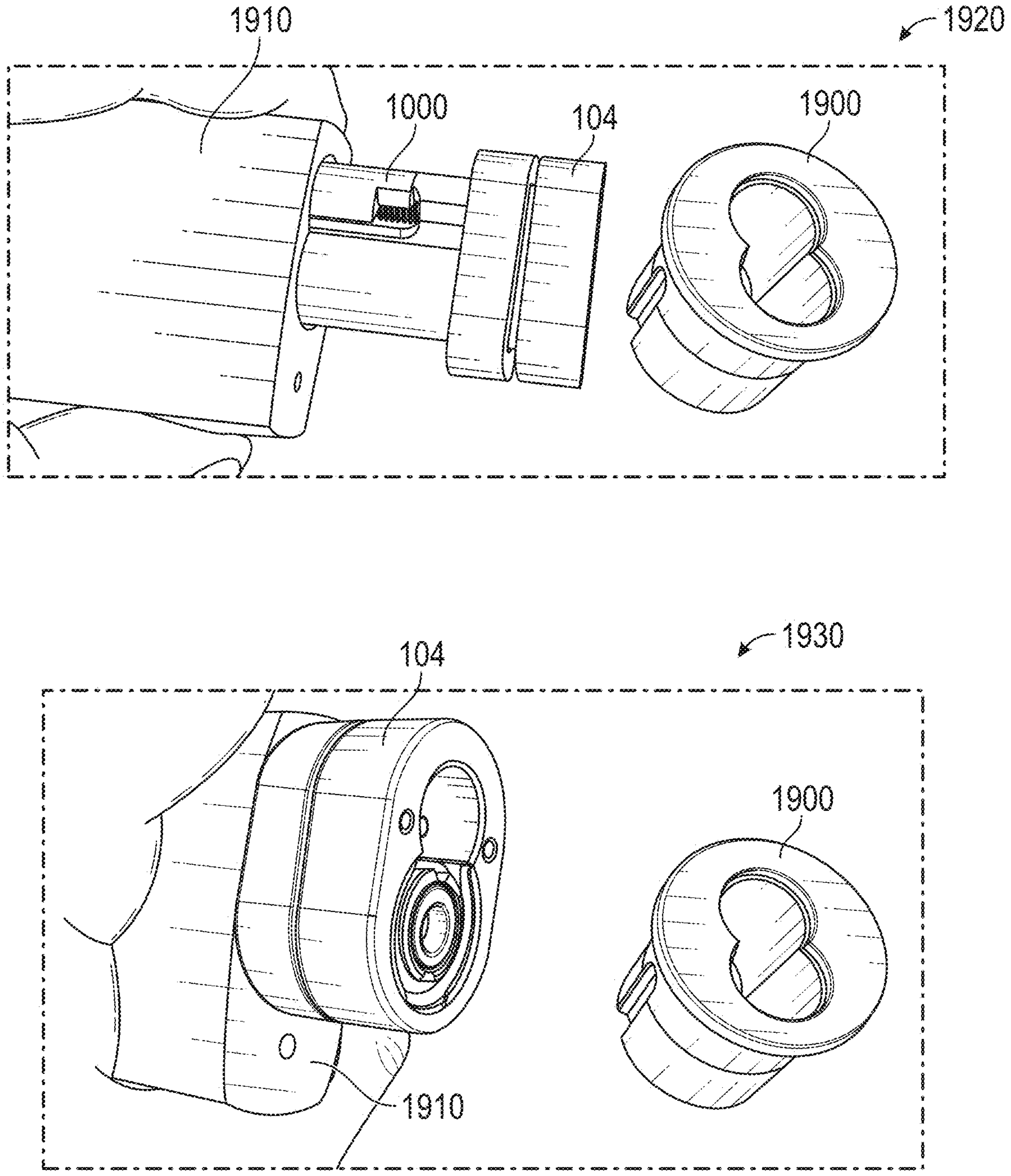
FIG. 19C depicts a pair of photographs of an electronic lock core that has been removed from a mortice lock housing and is being inserted into a padlock housing in accordance with certain embodiments disclosed herein.

FIG. 19C depicts a photograph 1920 of an electronic lock core 104 that has been removed from a mortice lock housing (e.g., the housing 1900) and is being inserted into a padlock housing (e.g., the housing 1910). As illustrated in the photograph 1920, the control lug 1000 is fully raised enabling the removal of the electronic lock core 104 from the housing 1900 and the insertion of the electronic lock core 104 into the housing 1910. The photograph 1930 depicts the electronic lock core 104 fully inserted into the housing 1910. Once inserted, the control lug 1000 may be lowered to modify the form factor of the electronic lock core 104 and to engage with a protrusion, latch, or extension within the housing 1910, which prevents removal of the electronic lock core plug 102 from the housing 1910. In some implementations, the control lug 1000 prevents removal of the electronic lock core 104 because the control lug 1000 is obstructed by the one or more protrusions 1902 of the aperture 1904, which may exist within both the housing 1900 as well as the housing 1910. These one or more protrusions 1902 may prevent the control lug 1000, and consequently the electronic lock core 104 from being moved or pulled through an aperture (e.g., the aperture 1904) of a housing configured to support a SFIC.

Example Electronic Lock Core Installation Process

Figure 20:
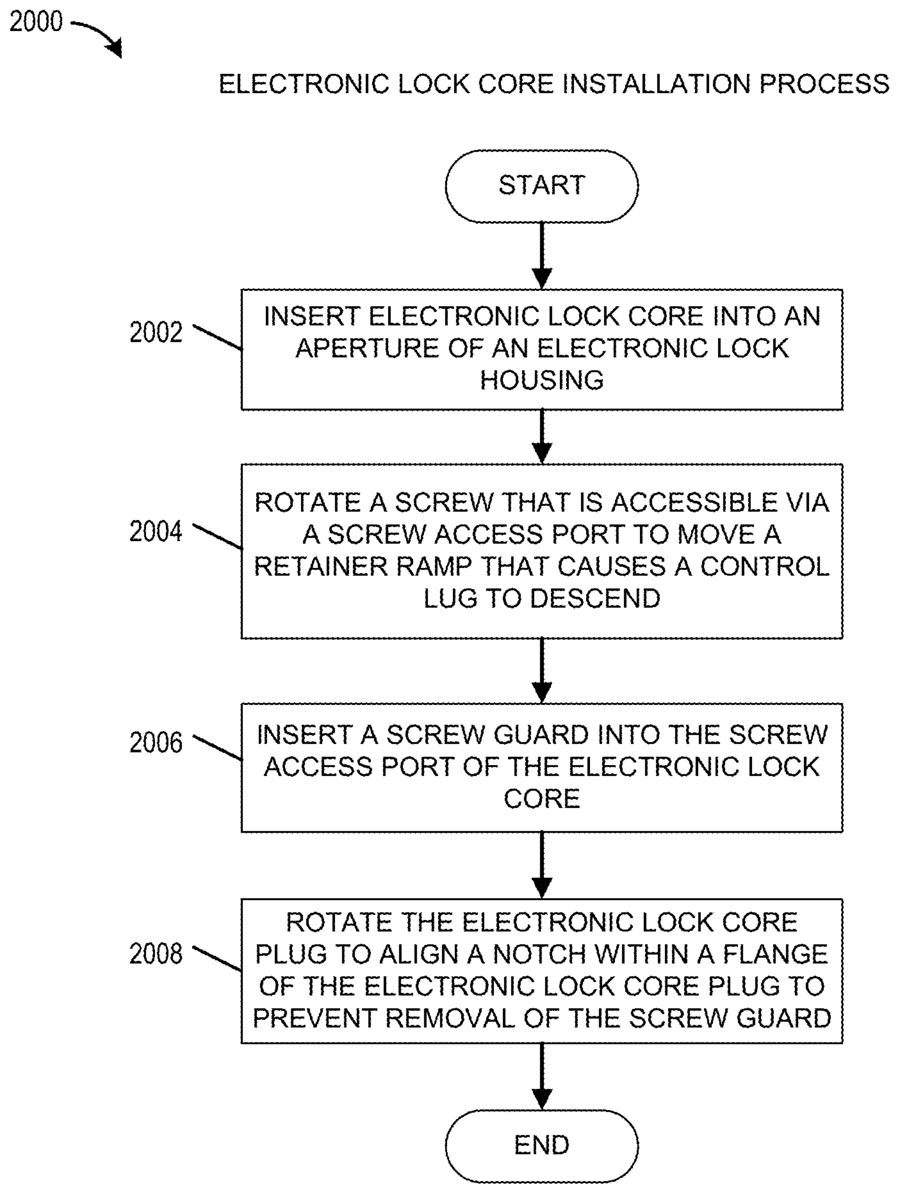
FIG. 20 presents a flowchart of an example electronic lock core installation process in accordance with certain embodiments disclosed herein.

FIG. 20 presents a flowchart of an example electronic lock core installation process 2000 in accordance with certain embodiments disclosed herein. The electronic lock core installation process 2000 can include any process for installing an electronic lock core 104 in an electronic lock 100, or into a housing (e.g., the housing 1900 or the housing 1910) of the electronic lock 100. In some embodiments, the electronic lock core 104 is an SIFC designed to fit into a housing configured to accept an SFIC. In some embodiments, certain operations may be performed in a different order or in parallel. Further, the electronic lock core installation process 2000 may be performed as part of a manufacturing process for an electronic lock 100, during installation of the electronic lock 100 at a site location or on a device to be secured, as part of an electronic lock core replacement process, or as part of any other process that may involve the installation of an electronic lock core.

The process 2000 begins, for example, at the block 2002 where an electronic lock core 104 is inserted into an aperture of an electronic lock 100, or an aperture of a housing (e.g., the housing 1900 or the housing 1910) of the electronic lock 100. The aperture may include any opening within the electronic lock 100 that is configured to receive the electronic lock core 104. Further, the electronic lock core 104 is inserted in such a manner that the face of the electronic lock core plug 102 (e.g., a portion with the cup 206) is exposed so that an electronic key 800 can mate with the cup 206 of the electronic lock core plug 102. The aperture of the electronic lock 100 may be shaped or configured to receive an electronic lock core 104 with an SFIC form factor.

At block 2004, the process 2000 involves rotating a screw 310 that is accessible via a screw access port of the electronic lock core 104. Rotating the screw may move a retainer ramp 1302 in a direction that causes a control lug 1000 to descend towards the electronic lock core plug 102. The screw 310 may be rotated clockwise to cause the retainer ramp 1302 to move towards a head (e.g., a portion of the screw configured to receive a screwdriver) of the screw 310 and, in turn, to cause the control lug 1000 to be lowered toward the electronic lock core plug 102. In some cases, the movement of the retainer ramp 1302 may further cause the control lug 1000 to move towards the face of the electronic lock core plug 102. The screw 310 may continue to be rotated until the control lug 1000 descends to a point where the control lug 1000 is in contact with a portion of the electronic lock core shell 404 that houses the electronic lock core plug 102 or to a point where the control lug 1000 can no longer descend further due to contact with the electronic lock core plug 102 or contact with a portion of the electronic lock core shell 404 surrounding the electronic lock core plug 102. In some cases, the screw 310 may continue to be rotated until the control lug 1000 engages with or abuts against one or more protrusions 1902 included in the housing of the electronic lock 100. Thus, in some cases, the control lug 1000 may be in contact with both the portion of the electronic lock core shell 404 housing the electronic lock core plug 102 (or a housing of the electronic lock core plug 102) and one or more protrusions 1902 that forms part of the shape of the aperture 1904. Moving the control lug 1000 may cause the electronic lock core 104 with an SFIC form factor to no longer satisfy the SFIC form factor, thereby preventing removal of the electronic lock core 104 from the housing of the electronic lock 100.

At block 2006, the process 2000 involves inserting a screw guard 204 into the screw access port of the electronic lock core 104. The screw guard 204 may include a magnet 312 that facilitates keeping the screw guard 204 in place. The magnet 312 may removably affix (or non-permanently affix) the screw guard 204 to a head of the screw 310 within the screw access port. Affixing the screw guard 204 to the head of the screw 310 may help maintain a position of the screw guard 204 and prevent the screw guard 204 from falling out or otherwise being removed at an undesired time. The screw guard 204 may be positioned such that a protrusion 306 of the screw guard 204 can be aligned with a flange 304 of the electronic lock core plug 102 to prevent removal of the screw guard 204 until such time that the flange 304 is rotated.

At block 2008, the process 2000 involves rotating the electronic lock core plug 102 to align a notch 502 within a flange 304 of the electronic lock core plug 102 to prevent removal of the screw guard 204. Aligning the notch 502 may include positioning the notch 502 such that it does not overlap with the protrusion 306 of the screw guard 204. In other words, the electronic lock core plug 102 may be rotated such that a portion of the flange 304 that does not include the notch 502 is aligned with the protrusion 306 of the screw guard 204 preventing removal of the screw guard 204 from the electronic lock 100. Further, the electronic lock core plug 102 may be rotated such that the cam lock 308 can extend out of a trench of the electronic lock core plug 102. In other words, the electronic lock core plug 102 can be rotated such that the electronic lock core 104 does not prevent the cam lock 308 from being extended beyond an outer circumference of the electronic lock core plug 102.

Example Electronic Lock Core Replacement Process

Figure 21:
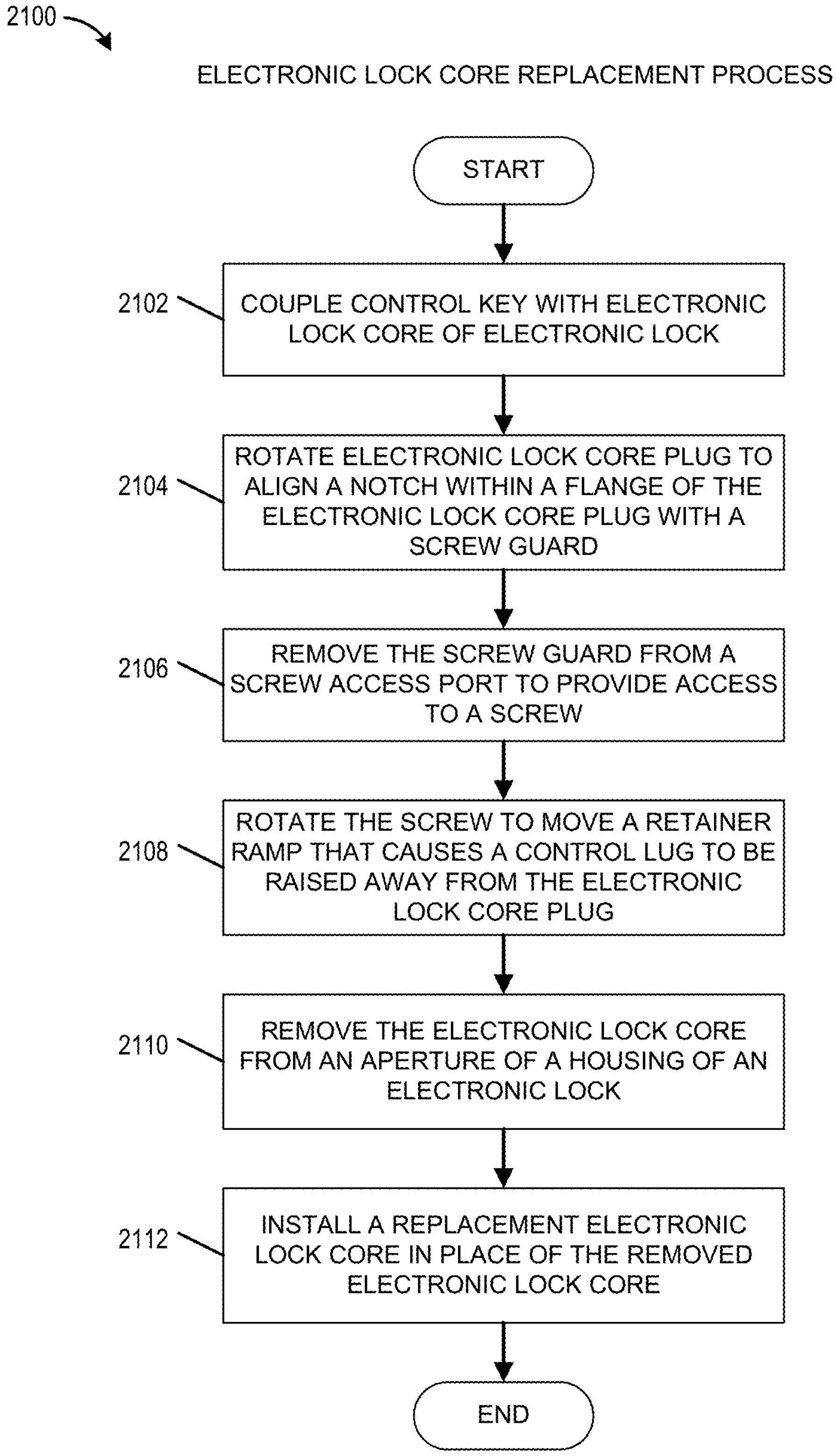
FIG. 21 presents a flowchart of an example electronic lock core replacement process in accordance with certain embodiments disclosed herein.

FIG. 21 presents a flowchart of an example electronic lock core replacement process 2100 in accordance with certain embodiments disclosed herein. The electronic lock core replacement process 2100 can include any process for replacing an electronic lock core 104 in an electronic lock 100 with another electronic lock core. The replacement electronic lock core may be of the same type as the electronic lock core 104, or may be an improved or different version of the electronic lock core 104 that is designed to fit within the same size space or housing as the electronic lock core 104. In some embodiments, the electronic lock core 104 is an SIFC designed to fit into a housing configured to accept an SFIC. In some embodiments, certain operations may be performed in a different order or in parallel. Further, the electronic lock core replacement process 2100 may be performed as part of a manufacturing process for an electronic lock 100, as part of a testing process, during installation of the electronic lock 100 at a site location or on a device to be secured, or as part of any other process that may involve the replacement of an electronic lock core in an electronic lock.

The process 2100 begins, for example, at the block 2102 where a control key (e.g., the electronic key 850) is coupled with the electronic lock core 104, or an electronic lock core plug 102, of the electronic lock 100. As described herein, using a standard electronic key or an electronic key that is not configured as a control key (e.g., an electronic key 800) may, in some cases, not be compatible with performing the process 2100 because, for example, the non-control key may include one or more retention tabs 802 that prevent removal of the non-control key when the electronic lock 100 is unlocked and therefore, the use of the non-control key may prevent removal of the electronic lock core 104. In contrast, the control key may omit the one or more retention tabs 802 enabling removal of the control key from the electronic lock core plug 102 even when the electronic lock 100 is in an unlocked state.

Coupling the electronic key 850 with the electronic lock core 104 may include inserting a nose 804 of the electronic key 850 into a cup 206 of the electronic lock core plug 102. Further, coupling the electronic key 850 with the electronic lock core 104 may include aligning one or more extensions 806 with one or more corresponding recesses 208 of the electronic lock core plug 102. The extensions 806 and corresponding recesses 208 may help align the electronic key 850 with the electronic lock core plug 102 even when the one or more retention tabs 802 are omitted.

In some embodiments, the block 2102 may include performing an unlocking process to unlock the electronic lock 100. The electronic lock 100 may determine whether the electronic key 850 is authorized to unlock the electronic lock 100 by, for example, authenticating the electronic key 850 and/or a user using the electronic key 850. If it is determined that the electronic key 850 or the user is authorized to unlock the electronic lock 100, the electronic lock 100 may be unlocked. Unlocking the electronic lock 100 may include, among other operations, retracting the cam lock 308 enabling rotation of the electronic lock core plug 102 as part of the block 2104.

At block 2104, the process 2100 includes rotating the electronic lock core plug 102 to align a notch 502 of a flange 304 of the electronic lock core plug 102 with a screw guard 204. Aligning the notch 502 with the screw guard 204 may include aligning the notch 502 with a protrusion 306 of the screw guard 204. By aligning the notch 502 with the protrusion 306, the screw guard 204 is no longer held in place by the flange 304 of the electronic lock core plug 102 and it is possible to remove the screw guard 204 from the screw access port of the electronic lock core 104. The screw access port may be a separate access port or aperture that includes a shaft or space for inserting the screw guard 204 and that is separate from an aperture that is configured to receive an electronic lock core. Alternatively, the screw access port may be a portion of a single aperture that includes multiple portions with one portion being configured to receive the screw guard 204 and one portion being configured to receive the electronic lock core plug 102 within an electronic lock core shell 404 of the electronic lock core 104.

At block 2106, the process 2100 includes removing the screw guard 204 from a screw access port of the electronic lock core 104 to provide access to a screw 310. The screw 310 may be part of a retainment assembly that retains or ejects the electronic lock core 104 from the electronic lock 100. The screw guard 204 may be removed by using a magnetic force from a magnet to pull the screw guard 204 from the screw access port. The magnet may be a magnet that is included in the electronic key 850 or may be any other magnet with a greater magnetic strength than the magnet 312 of the screw guard 204. The magnet 312 may be selected to have a lower magnetic strength than a magnet of the electronic key 850 to enable the electronic key 850 to be used to help remove the screw guard 204 and obtain access to the screw 310.

In some embodiments, removing the screw guard 204 may include removing or decoupling the electronic key 850 from the electronic lock core plug 102 after the notch 502 of the electronic lock core plug 102 is aligned with the screw guard 204. Removing the electronic key 850 is possible because the electronic key 850 omits the one or more retention tabs 802 of the electronic key 800. Further, removing the electronic key 850 may, in some cases, stop the shoulder 810 of the electronic key 850 from inhibiting removal of the screw guard 204. In some cases, the electronic key 850 may be shaped differently such that removal of the screw guard 204 is not inhibited when the electronic key 850 is coupled to the electronic lock core plug 102. In some such cases where the key is shaped differently (e.g., differently than illustrated in FIG. 8), either the electronic key 800 or the electronic key 850 may be used to replace the electronic lock core 104.

At block 2108, the process 2100 includes rotating the screw 310 to move a retainer ramp 1302 that causes a control lug 1000 to be raised away from the electronic lock core plug 102. Further, moving the retainer ramp 1302 may cause the control lug 1000 to disengage from one or more protrusions 1902 of an electronic lock housing (e.g., the housing 1900 or the housing 1910). Typically, although not necessarily, the screw 310 is rotated in a counterclockwise direction to cause the screw 310 to move the head of the screw 310 away from the retainer ramp 1302, which in turn may cause the control lug 1000 to be raised or disengaged from a portion of the electronic lock core shell 404 that houses the electronic lock core plug 102. In some cases, rotating the screw 310 may also cause the control lug 1000 to be moved away from the front of the electronic lock core plug 102 (e.g., away from the cup 206). Moving the control lug 1000 away from the front of the electronic lock core plug 102 may cause the control lug 1000 to disengage from one or more protrusions 1902 of the housing of the electronic lock 100. In some embodiments, the electronic lock core 104 does not satisfy the SFIC form factor prior to performing operations associated with the block 2108. Upon performing the operations associated with the block 2108 (e.g., adjusting the position of the control lug 1000), the electronic lock core 104 may be modified to confirm with the SFIC form factor, which enables removal of the electronic lock core 104 from the electronic lock 100 as described herein.

Rotating the screw 310 may be achieved by using a screwdriver, a star key, a hex key (sometimes referred to as an Allen wrench/key), or any other device that may be used to rotate a screw, which may include a standard head, or a specialized head. In some cases, the screwdriver may be included as part of the electronic key 850. For example, the electronic key 850 may include a screwdriver that is folded into or inserted into the electronic key 850. The screwdriver can be accessed or used upon removal of the screw guard 204 to rotate or adjust the screw 310.

At block 2110, the process 2100 includes removing the electronic lock core 104 from an aperture of a housing (e.g., the housing 1900 or the housing 1910) of the electronic lock 100. The aperture may include any space within the electronic lock 100 configured to hold or house the electronic lock core 104. In some embodiments, the aperture may be configured to receive or house an SFIC. In such cases, the electronic lock core 104 may have the form factor of an SFIC. In some embodiments, the form factor of the electronic lock core 104 may differ from an SFIC. In such cases, the form factor of the aperture of the electronic lock 100 may also differ from that of an SFIC and may be configured to accept the form factor of the electronic lock core 104. The electronic lock core 104, similar to the screw guard 204, may be removed using a magnet of the electronic key 850. Alternatively, or in addition, the electronic lock core 104 may be pulled out by hand, using a flat edge (e.g., screwdriver) that can be wedged behind a portion of the electronic lock core 104 (e.g., behind the flange 304), or using any other type of tool that can be used to remove the electronic lock core 104 from the electronic lock 100 upon disengagement of the control lug 1000. In some cases, the electronic lock core 104 may be pulled out by hand, or by positioning the electronic lock 100 such that gravity removes or helps to remove the electronic lock core 104.

At block 2112, the process 2100 includes installing a replacement electronic lock core in place of the removed electronic lock core 104. The operations associated with the block 2112 may include performing the process 2000 or one or more operations associated with the process 2000.

Terminology

Conditional language used herein, such as, among others, "can," "could," "might," "may," "e.g.," and the like, unless specifically stated otherwise, or otherwise understood within the context as used, may be generally intended to convey that certain embodiments include, while other embodiments do not include, certain features, elements and/or states. Thus, such conditional language may be not generally intended to imply that features, elements and/or states may be in any way required for one or more embodiments or that one or more embodiments necessarily include these features, elements and/or states.

Conjunctive language such as the phrase "at least one of X, Y, and Z," unless specifically stated otherwise, may be otherwise understood with the context as used in general to convey that an item, term, etc. may be either X, Y, or Z.

Thus, such conjunctive language may be not generally intended to imply that certain embodiments require the presence of at least one of X, at least one of Y, and at least one of Z.

While the above detailed description may have shown, described, and pointed out novel features as applied to various embodiments, it may be understood that various omissions, substitutions, and/or changes in the form and details of any particular embodiment may be made without departing from the spirit of the disclosure. As may be recognized, certain embodiments may be embodied within a form that does not provide all of the features and benefits set forth herein, as some features may be used or practiced separately from others.

Additionally, features described in connection with one embodiment can be incorporated into another of the disclosed embodiments, even if not expressly discussed herein, and embodiments may have the combination of features still fall within the scope of the disclosure. For example, features described above in connection with one embodiment can be used with a different embodiment described herein and the combination still fall within the scope of the disclosure.

It should be understood that various features and aspects of the disclosed embodiments can be combined with, or substituted for, one another in order to form varying modes of the embodiments of the disclosure. Thus, it may be intended that the scope of the disclosure herein should not be limited by the particular embodiments described above. Accordingly, unless otherwise stated, or unless clearly incompatible, each embodiment of this disclosure may comprise, additional to its essential features described herein, one or more features as described herein from each other embodiment disclosed herein.

Features, materials, characteristics, or groups described in conjunction with a particular aspect, embodiment, or example may be to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps may be mutually exclusive. The protection may be not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

Moreover, while operations may be depicted in the drawings or described in the specification in a particular order, such operations need not be performed in the particular order shown or in sequential order, or that all operations be performed, to achieve desirable results. Other operations that may be not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added.

For purposes of this disclosure, certain aspects, advantages, and novel features may be described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that may be within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure may be not intended to be limited by the specific disclosures of preferred embodiments in this section or elsewhere in this specification and may be defined by claims as presented in this section or elsewhere in this specification or as presented in the future. The language of the claims may be to be interpreted broadly based on the language employed in the claims and not limited to the examples described in the present specification or during the prosecution of the application, which examples may be to be construed as non-exclusive.

Unless the context clearly may require otherwise, throughout the description and the claims, the words "comprise", "comprising", and the like, may be to be construed in an inclusive sense as opposed to an exclusive or exhaustive sense, that may be to say, in the sense of "including, but not limited to".

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. It may be therefore intended that such changes and modifications be included within the scope of the invention. Moreover, not all of the features, aspects and advantages may be necessarily required to practice the present invention. Accordingly, the scope of the present invention may be intended to be defined only by the claims.

What is claimed is:

1. A method of installing an electronic lock core of an electronic lock, the method comprising:

inserting the electronic lock core into an aperture of an electronic lock housing of the electronic lock such that the electronic lock core is positioned so that a face of the electronic lock core is exposed to a user via the aperture of the electronic lock housing;

rotating a screw that is accessible via a screw access port of the electronic lock core and that is inserted into a retainer ramp to cause the retainer ramp to move axially along the screw from a first position to a second position, and wherein moving the retainer ramp from the first position to the second position causes a control lug to engage with the electronic lock housing of the electronic lock;

inserting a screw guard into the screw access port of the electronic lock core, wherein the screw access port provides access to a screw head of the screw, and wherein the screw guard prevents access to the screw head when the screw guard is inserted into the screw access port; and using an electronic key, rotating an electronic lock core plug of the electronic lock core to align a notch within a flange of the electronic lock core plug such that the screw guard cannot be removed from the screw access port.

2. The method of claim 1, wherein the electronic key comprises a control key, wherein the control key omits a retention tab that is included in a non-control key, and wherein the retention tab prevents removal of the non-control key when the electronic lock core is in an unlocked state.

3. The method of claim 1, wherein the electronic lock core is a small format interchangeable core, and wherein the aperture of the electronic lock housing is configured to receive the small format interchangeable core.

4. The method of claim 1, wherein causing the control lug to engage with the electronic lock housing prevents the electronic lock core from moving within or being removed from the electronic lock housing.

5. The method of claim 1, wherein the electronic lock core comprises a replaceable electronic lock core.

6. The method of claim 1, wherein moving the retainer ramp from the first position to the second position further causes the control lug to engage with a protrusion of an aperture of the electronic lock housing preventing removal of the electronic lock core.

7. A method of replacing a first electronic lock core of an electronic lock with a second electronic lock core, the method comprising:

coupling a control key with a first electronic lock core plug of the first electronic lock core to unlock the electronic lock;

rotating the first electronic lock core plug to align a notch within a flange of the first electronic lock core plug with a first screw guard that is installed into a first screw access port of the first electronic lock core;

removing the first screw guard from the first screw access port of the first electronic lock core, wherein the first screw access port provides access to a screw head of a first screw, wherein the first screw guard prevents access to the screw head when the first screw guard is inserted into the first screw access port, and wherein the first screw is inserted into a first retainer ramp;

rotating the first screw in a first direction to cause the first retainer ramp to move axially along the first screw from a second position to a first position, wherein moving the first retainer ramp from the second position to the first position causes a first control lug to disengage from an electronic lock housing of the electronic lock;

removing the first electronic lock core from an aperture of the electronic lock housing of the electronic lock; and installing the second electronic lock core into the electronic lock housing, wherein installing the second electronic lock core comprises:

inserting the second electronic lock core into the aperture of the electronic lock housing such that the second electronic lock core is positioned so that a face of the second electronic lock core is exposed to a user via the aperture of the electronic lock housing;

rotating a second screw of the second electronic lock core in a second direction to cause a second retainer ramp to move axially along the second screw from a first position to a second position, wherein moving the second retainer ramp from the first position to the second position causes a second control lug to engage with the electronic lock housing;

inserting a second screw guard into a second screw access port of the second electronic lock core; and using the control key, rotating a second electronic lock core plug of the second electronic lock core to align a notch within a flange of the second electronic lock core plug such that the second screw guard cannot be removed from the second screw access port.

8. The method of claim 7, wherein the control key prevents removal of the first screw guard when the control key is coupled to the first electronic lock core plug.

9. The method of claim 8, wherein removing the first screw guard comprises decoupling the control key from the first electronic lock core plug after the notch of the first electronic lock core plug is aligned with the first screw guard.

10. The method of claim 9, wherein removing the first screw guard further comprises using a first magnet to remove the first screw guard from the first screw access port.

11. The method of claim 10, wherein the first magnet is part of the control key.

12. The method of claim 11, wherein the first screw guard comprises a second magnet that engages with the first screw of the first electronic lock core, and wherein a magnetic strength of the first magnet is greater than a magnetic strength of the second magnet.

13. The method of claim 7, wherein removing the first electronic lock core comprises using the control key to remove the first electronic lock core by at least:

coupling the control key with the first electronic lock core plug; and pulling the first electronic lock core out of the electronic lock housing of the electronic lock.

14. The method of claim 7, wherein the first electronic lock core is a small format interchangeable core, and wherein the aperture of the electronic lock housing is configured to receive the small format interchangeable core.

15. The method of claim 7, wherein rotating the first screw in the first direction comprises rotating the first screw in a direction that loosens the first screw.

16. The method of claim 7, wherein the control key omits a retention tab that is included in a non-control key, and wherein the retention tab prevents removal of the non-control key when the first electronic lock core is in an unlocked state.

17. The method of claim 7, wherein rotating the second screw in the second direction comprises rotating the second screw in a direction that tightens the second screw.

18. The method of claim 7, wherein causing the second control lug to engage with the electronic lock housing prevents the second electronic lock core from moving within or being removed from the electronic lock housing.

19. The method of claim 7, wherein the second screw guard and the first screw guard are the same.

20. The method of claim 7, wherein moving the second retainer ramp from the first position to the second position further causes the second control lug to engage with a protrusion of the aperture of the electronic lock housing preventing removal of the second electronic lock core.

21. The method of claim 7, wherein moving the first retainer ramp from the second position to the first position further causes the first control lug to disengage from a protrusion of the aperture of the electronic lock housing.

* * * * *